(12) United States Patent
Hsieh et al.

(10) Patent No.: US 8,576,496 B2
(45) Date of Patent: Nov. 5, 2013

(54) IMAGING LENS SYSTEM

(75) Inventors: Dung-Yi Hsieh, Taichung (TW);
Tsung-Han Tsai, Taichung (TW);
Wei-Yu Chen, Taichung (TW)

(73) Assignee: Largan Precision Co., Ltd, Taichung (TW)

(*) Notice: Subject to any disclaimer, the term of this patent is extended or adjusted under 35 U.S.C. 154(b) by 0 days.

(21) Appl. No.: 13/557,152

(22) Filed: Jul. 24, 2012

(65) Prior Publication Data

US 2013/0250438 A1 Sep. 26, 2013

(30) Foreign Application Priority Data

Mar. 23, 2012 (TW) ............... 101110035 A

(51) Int. Cl.
*G02B 9/10* (2006.01)
*G02B 13/003* (2006.01)
*G02B 13/18* (2006.01)

(52) U.S. Cl.
USPC ........................ 359/708; 359/717; 359/795

(58) Field of Classification Search
USPC ................ 359/642, 717, 772, 795
See application file for complete search history.

(56) References Cited

U.S. PATENT DOCUMENTS

| | | | | |
|---|---|---|---|---|
| 6,744,570 B1 * | 6/2004 | Isono | | 359/772 |
| 7,289,278 B1 * | 10/2007 | Jo et al. | | 359/773 |
| 7,535,659 B2 * | 5/2009 | Sano | | 359/773 |
| 7,948,692 B2 * | 5/2011 | Tang et al. | | 359/784 |
| 7,957,076 B2 | 6/2011 | Tang | | |
| 8,089,704 B2 | 1/2012 | Tang et al. | | |
| 8,094,231 B2 | 1/2012 | Tsai | | |
| 2010/0053778 A1 * | 3/2010 | Saito | | 359/795 |
| 2010/0097711 A1 * | 4/2010 | Saito | | 359/795 |
| 2010/0110566 A1 * | 5/2010 | Saito | | 359/739 |
| 2011/0096221 A1 * | 4/2011 | Tsai | | 348/340 |
| 2011/0181962 A1 * | 7/2011 | Hsu et al. | | 359/717 |

* cited by examiner

*Primary Examiner* — Ricky Mack
*Assistant Examiner* — William Alexander
(74) *Attorney, Agent, or Firm* — Morris Manning & Martin LLP; Tim Tingkang Xia, Esq.

(57) ABSTRACT

This invention provides an imaging lens system comprising two non-cemented lens elements with refractive power: a positive first lens element having a convex object-side surface at a paraxial region and a convex or flat image-side surface at the paraxial region; and a negative second lens element having a concave object-side surface at a paraxial region and a concave image-side surface at a paraxial region, and both the object-side and image-side surfaces being aspheric; wherein, the shape of the image-side surface of the second lens element changes from concave when near an optical axis to convex when away from the optical axis. By such arrangement, the imaging lens system has not only a shorter total track length for compact electronic products, but also the advantage of a more comparable focusing performance between the short wavelength and long wavelength applications with improved image quality.

19 Claims, 21 Drawing Sheets

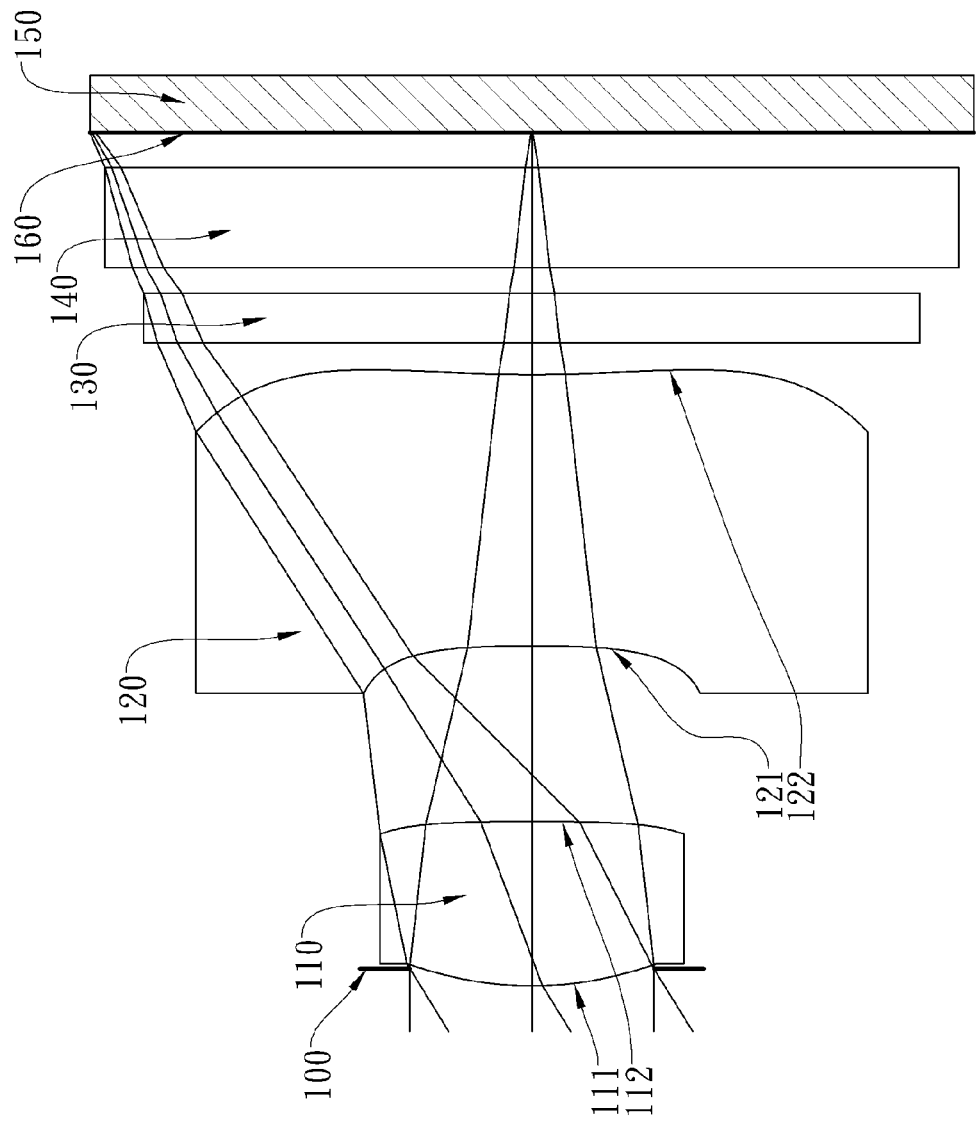

IMAGING LENS SYSTEM

CROSS-REFERENCE TO RELATED APPLICATION

This non-provisional application claims priority under 35 U.S.C. §119(a) on Patent Application No. 101110035 filed in Taiwan (R.O.C.) on Mar. 23, 2012, the entire contents of which are hereby incorporated by reference.

BACKGROUND OF THE INVENTION

1. Field of the Invention

The present invention relates to an imaging lens system, and more particularly, to an imaging lens system used in compact electronic products and 3D applications thereof.

2. Description of the Prior Art

The principal demand of electronic products is being compact and portable; therefore, except for reducing manufacture costs, the optical systems equipped on various portable electronic products such as smart phones, tablet computers, Ultrabooks, etc. are continuously requested to be compact. In the conventional optical systems with at least three lens elements such as disclosed by U.S. Pat. Nos. 8,094,231 B2 & 8,089,704 B2, miniaturization is limited due to configuring too many lens elements, and the costs and complexity of manufacture are also higher in those systems.

Although some two-lens element optical systems such as U.S. Pat. No. 7,957,076 has been disclosed, the configuration thereof results in excessive difference between the focuses of short wavelength and long wavelength and thereby undesired effect of defocus is occurred. If an optical system fails to correct the aforesaid problems effectively, the imaging ability and quality thereof is inevitably limited.

In light of the foregoing, conventional two-lens element optical systems have the drawback of unfavorable image quality, and three-lens element optical systems are not suitable for compact and portable electronic products due to the inevitably excessively long total track length thereof. It is obvious that the problem of obtaining a balance between image quality and total track length has been continuously existed in the field. Therefore, there is a need for an imaging system having superior image quality and proper total track length for compact portable electronic products.

SUMMARY OF THE INVENTION

The present invention provides an imaging lens system, in order from an object side to an image side comprising two non-cemented lens elements with refractive power: a positive first lens element having a convex object-side surface at a paraxial region thereof and a convex or flat image-side surface at the paraxial region thereof; a negative second lens element having a concave object-side surface at a paraxial region thereof and a concave image-side surface at a paraxial region thereof, and both the object-side and image-side surfaces being aspheric; wherein, the shape of the image-side surface of the second lens element changes from concave when near an optical axis to convex when away from the optical axis; wherein an Abbe number of the first lens element is V1, an Abbe number of the second lens element is V2, a curvature radius of the object-side surface of the first lens element is R1, a curvature radius of the image-side surface of the first lens element is R2, a focal length of the imaging lens system is f, half of the maximal field of view is HFOV, and they satisfy the following relations: $0.4 < \ln(V1/V2) < 1.1$; $-1.0 \leq (R1+R2)/(R1-R2) < 0.4$; and $1.0 \text{ mm} < f/\tan(\text{HFOV}) < 7.5 \text{ mm}$.

On the other hand, the present invention provides an imaging lens system, in order from an object side to an image side comprising two non-cemented lens elements with refractive power: a positive first lens element having a convex object-side surface at a paraxial region thereof and a convex or flat image-side surface at the paraxial region thereof; a negative second lens element having a concave object-side surface at a paraxial region thereof and a concave image-side surface at a paraxial region thereof, and both the object-side and image-side surfaces being aspheric; wherein, the shape of the image-side surface of the second lens element changes from concave when near an optical axis to convex when away from the optical axis; wherein an Abbe number of the first lens element is V1, an Abbe number of the second lens element is V2, a curvature radius of the object-side surface of the first lens element is R1, a curvature radius of the image-side surface of the first lens element is R2, the imaging lens system further comprises a stop, an axial distance from the stop to the image-side surface of the second lens element is SD, an axial distance between the object-side surface of the first lens element and the image-side surface of the second lens element is TD, and they satisfy the following relations: $0.4 < \ln(V1/V2) < 1.1$; $-1.0 \leq (R1+R2)/(R1-R2) < 0.4$; and $0.9 < SD/TD < 1.2$.

By such arrangement, the imaging lens system has not only a shorter total track length for compact electronic products, but also the advantage of a more comparable focusing performance between the short wavelength and long wavelength applications for improved image quality.

In the aforementioned imaging lens system, the first lens element has positive refractive power, which provides the main refractive power for the imaging lens system and is favorable for reducing the total track length of the system. When the second lens element has negative refractive power, the aberration produced by the positive first lens element can be favorably corrected.

In the aforementioned imaging lens system, when the first lens element has a convex object-side surface at a paraxial region thereof and a convex or flat image-side surface at the paraxial region thereof, the refractive power of the first lens element can be properly adjusted for reducing the total track length of the system. When the second lens element has a concave object-side surface at a paraxial region thereof and a concave image-side surface at a paraxial region thereof, the negative refractive power thereof can be effectively strengthened for correcting the aberration produced by the positive first lens element. On the other hand, when the shape of the image-side surface of the second lens element changes from concave when near an optical axis to convex when away from the optical axis, the distortion from off-axis light and high order aberration of the system can be corrected for improving image resolution.

BRIEF DESCRIPTION OF THE DRAWINGS

FIG. 1A shows an imaging lens system in accordance with a first embodiment of the present invention.

DETAILED DESCRIPTION OF THE PREFERRED EMBODIMENTS

Figure 1B:
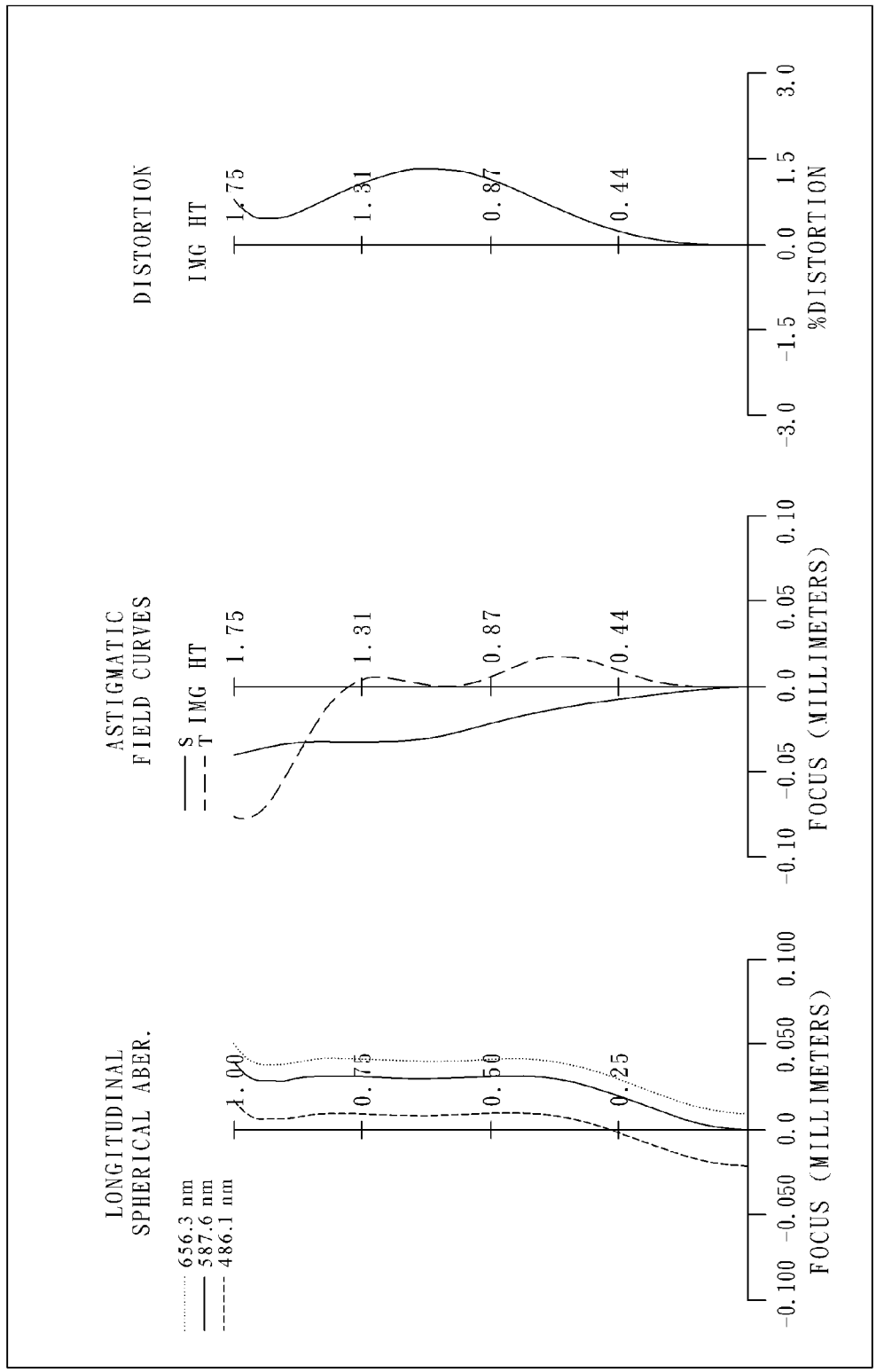
FIG. 1B shows the aberration curves of the first embodiment of the present invention.

The present invention provides an imaging lens system, in order from an object side to an image side comprising two non-cemented lens elements with refractive power: a positive first lens element having a convex object-side surface at a paraxial region thereof and a convex or flat image-side surface at the paraxial region thereof; and a negative second lens element having a concave object-side surface at a paraxial region thereof and a concave image-side surface at a paraxial region thereof, and both the object-side and image-side surfaces being aspheric; wherein, the shape of the image-side surface of the second lens element changes from concave when near an optical axis to convex when away from the optical axis; wherein an Abbe number of the first lens element is V1, an Abbe number of the second lens element is V2, a curvature radius of the object-side surface of the first lens element is R1, a curvature radius of the image-side surface of the first lens element is R2, a focal length of the imaging lens system is f, half of the maximal field of view is HFOV, and they satisfy the following relations: $0.4 < \ln(V1/V2) < 1.1$; $-1.0 \le (R1+R2)/(R1-R2) < 0.4$, and $1.0 \text{ mm} < f/\tan(\text{HFOV}) < 7.5 \text{ mm}$.

When the relation of $0.4 < \ln(V1/V2) < 1.1$ is satisfied, the excessive disparity between the focusing performance of short wavelength and long wavelength can be avoided. Also, the advantage of correcting chromatic aberration can be obtained. Preferably, the following relation is satisfied: $0.7 < \ln(V1/V2) < 1.1$; more preferably, the following relation is satisfied: $0.8 < \ln(V1/V2) < 1.1$.

When the relation of $-1.0 \le (R1+R2)/(R1-R2) < 0.4$ is satisfied, the positive refractive power of the first lens element can be properly controlled for correcting spherical aberration; preferably, the following relation is satisfied: $-1.0 \le (R1+R2)/(R1-R2) < -0.3$.

When the relation of $1.0 \text{ mm} < f/\tan(\text{HFOV}) < 7.5 \text{ mm}$ is satisfied, a proper field of view can be obtained. An excessive large field of view results in severe distortion of off-axis image; whereas, an excessive small field of view limits the scope of imaging; therefore, by properly adjusting the field of view, a proper imaging scope can be obtained while not causing distortion.

In the aforementioned imaging lens system, the focal length of the imaging lens system is f, a focal length of the second lens element is f2, and they preferably satisfy the following relation: $-1.2 < f/f2 < -0.5$. When the above relation is satisfied, the negative refractive power of the second lens element can effectively correct the aberration caused by the first lens element with positive refractive power.

In the aforementioned imaging lens system, a focal length of the first lens element is f1, the focal length of the second lens element is f2, and they preferably satisfy the following relation: $-0.9 < f1/f2 < -0.4$. When the above relation is satisfied, the refractive power distribution between the first lens element and the second lens element is more balanced, which can prevent the occurrence of spherical aberration due to excessive large positive refractive power of the first lens element. Moreover, the negative refractive power of the second lens element is more suitable under this circumstance for correcting the aberration produced by the first lens element.

In the aforementioned imaging lens system, a curvature radius of the image-side surface of the second lens element is R4, a curvature radius of the object-side surface of the second lens element is R3, and they preferably satisfy the following relation: $-2.0 < R4/R3 < 0$. When the above relation is satisfied, the negative refractive power of the second lens element can be adjusted properly for correcting the aberration produced by the system.

In the aforementioned imaging lens system, an axial distance between the first lens element and the second lens element is T12, a central thickness of the second lens element is CT2, and they preferably satisfy the following relation: $0.3 < T12/CT2 < 1.1$. When the above relation is satisfied, the interval between the first lens element and the second lens element is more suitable for the manufacture of the lens elements. On the other hand, the thickness of the second lens element is properly adjusted for the manufacture and formation of the second lens element, and thereby the yield rate of the product is raised.

In the aforementioned imaging lens system, the system further comprises a stop, an axial distance from the stop to the image-side surface of the second lens element is SD, with the direction toward the image-side side defined as positive or vice versa; an axial distance between the object-side surface of the first lens element and the image-side surface of the second lens element is TD, and they preferably satisfy the following relation: $0.9 < SD/TD < 1.2$. When the above relation is satisfied, it is favorable for the system to obtain a balance between the properties of telecentricity and wide field of view.

In the aforementioned imaging lens system, an axial distance between the object-side surface of the first lens element and the image-side surface of the second lens element is TD, a maximal image height of the imaging lens system is ImgH, and they preferably satisfy the following relation: $0.9 < TD/ImgH < 1.65$. When the above relation is satisfied, it is favorable for keeping the system compact for being equipped on portable electronic products.

On the other hand, the present invention provides an imaging lens system, in order from an object side to an image side comprising two non-cemented lens elements with refractive power: a positive first lens element having a convex object-side surface at a paraxial region thereof and a convex or flat image-side surface at the paraxial region thereof; and a negative second lens element having a concave object-side surface at a paraxial region thereof and a concave image-side surface at a paraxial region thereof, and both the object-side and image-side surfaces being aspheric; wherein, the shape of the image-side surface of the second lens element changes from concave when near an optical axis to convex when away from the optical axis; wherein an Abbe number of the first lens element is V1, an Abbe number of the second lens element is V2, a curvature radius of the object-side surface of the first lens element is R1, a curvature radius of the image-side surface of the first lens element is R2, the imaging lens system further comprises a stop, an axial distance from the stop to the image-side surface of the second lens element is SD, an axial distance between the object-side surface of the first lens element and the image-side surface of the second lens element is TD, and they satisfy the following relations: $0.4<\ln(V1/V2)<1.1$; $-1.0\leq(R1+R2)/(R1-R2)<0.4$; and $0.9<SD/TD<1.2$.

When the relation of $0.4<\ln(V1/V2)<1.1$ is satisfied, the problem of defocus resulting from excessive difference between the focuses of short wavelength and long wavelength can be avoided. Also, the advantage of correcting chromatic aberration can be obtained. Preferably, the following relation is satisfied: $0.7<\ln(V1/V2)<1.1$; more preferably, the following relation is satisfied: $0.8<\ln(V1/V2)<1.1$.

When the relation of $-1.0\leq(R1+R2)/(R1-R2)<0.4$ is satisfied, the positive refractive power of the first lens element can be properly controlled for correcting spherical aberration; preferably, the following relation is satisfied: $-1.0\leq(R1+R2)/(R1-R2)<-0.3$.

When the relation of $0.9<SD/TD<1.2$ is satisfied, a favorable balance can be obtained between the properties of telecentricity and wide field of view.

In the aforementioned imaging lens system, a focal length of the imaging lens system is f, a focal length of the first lens element is f1, a focal length of the second lens element is f2, and they preferably satisfy the following relation: $1.5<f(1/f1+1/|f2|)<2.25$. When the above relation is satisfied, the refractive power distribution between the first lens element and the second lens element is more balanced, which can prevent the occurrence of spherical aberration due to excessive large positive refractive power of the first lens element. Moreover, the negative refractive power of the second lens element is more suitable under this circumstance for correcting the aberration produced by the first lens element.

In the aforementioned imaging lens system, a curvature radius of the image-side surface of the second lens element is R4, a curvature radius of the object-side surface of the second lens element is R3, and they preferably satisfy the following relation: $-2.0<R4/R3<0$. When the above relation is satisfied, the negative refractive power of the second lens element can be adjusted properly for correcting the aberration produced by the system.

In the aforementioned imaging lens system, a focal length of the imaging lens system is f, half of the maximal field of view is HFOV, and they preferably satisfy the following relation: $1.0\text{ mm}<f/\tan(HFOV)<7.5\text{ mm}$. When the above relation is satisfied, a proper field of view can be obtained. An excessive large field of view results in severe distortion of off-axis image; whereas, an excessive small field of view limits the scope of imaging; therefore, by properly adjusting the field of view, a proper imaging scope can be obtained without producing significant distortion.

In the aforementioned imaging lens system, a distance in parallel with an optical axis from a vertex of the image-side surface of the second lens element on the optical axis to a maximal effective diameter position on the image-side surface of the second lens element is SAG22, with the direction toward the image-side side defined as positive or vice versa; a central thickness of the second lens element is CT2, and they preferably satisfy the following relation: $-0.5<SAG22/CT2<0$. When the above relation is satisfied, the shape of the second lens element is not excessive bent and the thickness thereof is suitable, which is not only favorable for the manufacture and formation of the lens elements, but also favorable for reducing the space required for assembling the lens elements and thereby the arrangement of the system could be more compact.

In the aforementioned imaging lens system, an axial distance between the object-side surface of the first lens element and the image-side surface of the second lens element is TD, a maximal image height of the imaging lens system is ImgH, which is also defined here as half of a diagonal length of an effective photosensitive area of an image sensor, and they preferably satisfy the following relation: $0.9<TD/ImgH<1.65$. When the above relation is satisfied, it is favorable for keeping the system compact for being equipped on portable electronic products.

In the aforementioned imaging lens system, the lens elements can be made of glass or plastic material. If the lens elements are made of glass, the freedom for distributing the refractive power of the imaging lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the imaging lens system can be effectively reduced.

The present imaging lens system may comprise at least one stop. Said stop includes but not limits to an aperture stop, a glare stop, or a field stop. Said glare stop or said field stop can be configured for reducing stray light resulting in improved image quality.

In the present imaging lens system, an aperture stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

In the present imaging lens system, if a lens element has a convex surface, it means the portion of the surface in proximity to the optical axis is convex; if a lens element has a concave surface, it means the portion of the surface in proximity to the optical axis is concave.

Figure 11:
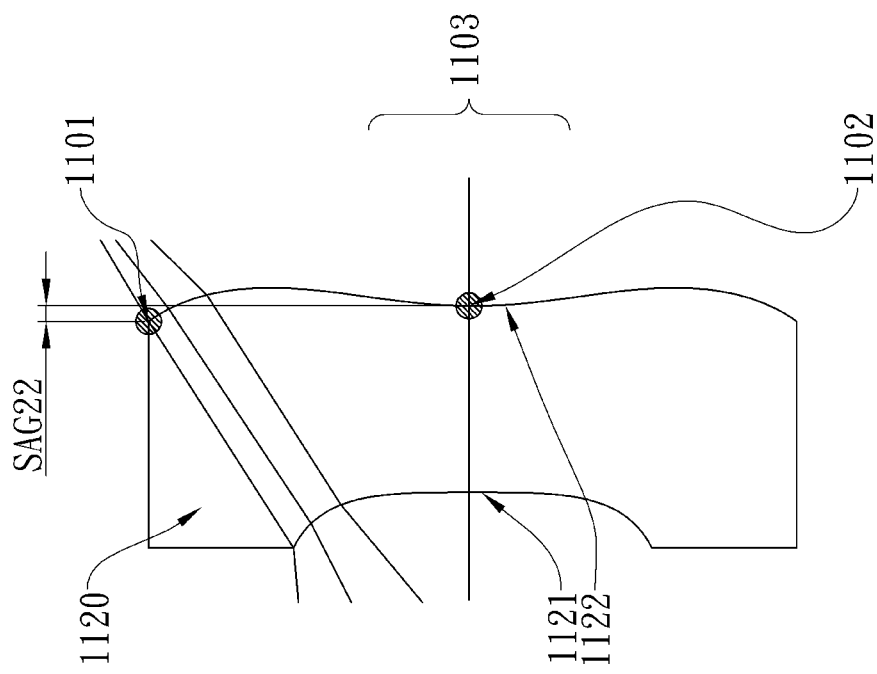
FIG. 11 shows the distance and relative site represented by SAG22 and illustrates the changes in shape of the second lens element.

Please refer to FIG. 11, the second lens element 1120 has a concave object-side surface 1121 and a concave image-side surface 1122. It is noted that, in the embodiment showed in FIG. 11, the shape of the image-side surface 1122 of the second lens element 1120 changes from concave when near an optical axis 1103 to convex when away from the optical axis. Furthermore, a distance in parallel with an optical axis from a vertex 1102 of the image-side surface 1122 of the second lens element 1120 on the optical axis to a maximal effective diameter position 1101 on the image-side surface 1122 of the second lens element 1120 is SAG22. In the instant specification, with the direction toward the image-side side, SAG22 is defined as positive or vice versa.

Preferred embodiments of the present invention will be described in the following paragraphs by referring to the accompanying drawings.

Embodiment 1

FIG. 1A shows an imaging lens system in accordance with the first embodiment of the present invention, and FIG. 1B shows the aberration curves of the first embodiment of the present invention. The imaging lens system of the first embodiment of the present invention mainly comprises two non-cemented lens elements, in order from an object side to an image side:

a plastic first lens element 110 with positive refractive power having a convex object-side surface 111 and a convex image-side surface 112, the object-side and image-side surfaces 111 and 112 thereof being aspheric; and a plastic second lens element 120 with negative refractive power having a concave object-side surface 121 and a concave image-side surface 122, the object-side and image-side surfaces 121 and 122 thereof being aspheric; wherein the shape of the image-side surface 122 of the second lens element 120 changes from concave when near an optical axis to convex when away from the optical axis;

wherein a stop, can be an aperture stop 100 is disposed between an imaged object and the first lens element 110;

the imaging lens system further comprises a IR cut-filter 130 disposed between the image-side surface 122 of the second lens element 120 and a cover glass 140; the filter 130 is made of glass and has no influence on the focal length of the imaging lens system; the imaging lens system further comprises an image sensor 150 provided on an image plane 160.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 2.79 mm, Fno = 2.87, HFOV = 31.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.069 | | | | |
| 2 | Lens 1 | 1.340 | ASP | 0.655 | Plastic | 1.544 | 55.9 | 2.27 |
| 3 | | −13.281 | ASP | 0.699 | | | | |
| 4 | Lens 2 | −6.681 | ASP | 1.080 | Plastic | 1.640 | 23.3 | −4.50 |
| 5 | | 5.383200) | ASP | 0.125 | | | | |
| 6 | IR-filter | Plano | | 0.200 | Glass | 1.517 | 64.2 | — |
| 7 | | Plano | | 0.100 | | | | |
| 8 | Cover-glass | Plano | | 0.400 | Glass | 1.517 | 64.2 | — |
| 9 | | Plano | | 0.138 | | | | |
| 10 | Image | Plano | | — | | | | |

* Reference wavelength for Focal length and Index calculation is 587.6 nm

TABLE 2

Aspheric Coefficients

| Surface # | 2 | 3 | 4 | 5 |
|---|---|---|---|---|
| k = | −1.1591E−01 | 6.9423E+01 | 9.0000E+01 | −3.0585E+01 |
| A4 = | −1.6308E−01 | −1.4275E−01 | −3.4817E−01 | −1.1441E−01 |
| A6 = | 1.4270E+00 | −2.2112E−01 | −8.1090E−01 | 1.0362E−01 |
| A8 = | −1.1228E+01 | −4.6808E−01 | 8.3358E+00 | −1.9161E−01 |
| A10 = | 3.8473E+01 | 1.0100E+00 | −4.6920E+01 | 1.6215E−01 |
| A12 = | −5.2707E+01 | −1.8597E+00 | 1.1271E+02 | −6.9475E−02 |
| A14 = | | | −1.0848E+02 | 1.1739E−02 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present imaging lens system, the focal length of the imaging lens system is f, and it satisfies the following relation: f=2.79 (mm).

In the first embodiment of the present imaging lens system, the f-number of the imaging lens system is Fno, and it satisfies the relation: Fno=2.87.

In the first embodiment of the present imaging lens system, half of the maximal field of view is HFOV, and it satisfies the relation: HFOV=31.7 deg.

In the first embodiment of the present imaging lens system, an Abbe number of the first lens element 110 is V1, an Abbe number of the second lens element 120 is V2, and they satisfy the following relation: ln(V1/V2)=0.88.

In the first embodiment of the present imaging lens system, an axial distance between the first lens element 110 and the second lens element 120 is T12, a central thickness of the second lens element 120 is CT2, and they satisfy the following relation: T12/CT2=0.65.

In the first embodiment of the present imaging lens system, a curvature radius of the object-side surface 111 of the first lens element 120 is R1, a curvature radius of the image-side surface 112 of the first lens element 110 is R2, and they satisfy the following relation: (R1+R2)/(R1−R2)=−0.82.

In the first embodiment of the present imaging lens system, a curvature radius of the image-side surface 122 of the second lens element 120 is R4, a curvature radius of the object-side surface 121 of the second lens element 120 is R3, and they satisfy the following relation: R4/R3=−0.81.

In the first embodiment of the present imaging lens system, the focal length of the imaging lens system is f, a focal length of the second lens element 120 is f2, and they satisfy the following relation: f/f2=−0.62.

In the first embodiment of the present imaging lens system, a focal length of the first lens element 110 is f1, the focal length of the second lens element 120 is f2, and they satisfy the following relation: f1/f2=−0.50.

In the first embodiment of the present imaging lens system, the focal length of the imaging lens system is f, the focal length of the first lens element 110 is f1, the focal length of the second lens element 120 is f2, and they satisfy the following relation: f(1/f1+1/|f2|)=1.85.

In the first embodiment of the present imaging lens system, a distance in parallel with an optical axis from a vertex of the image-side surface 122 of the second lens element 120 on the optical axis to a maximal effective diameter position on the image-side surface 122 of the second lens element 120 is SAG22, a central thickness of the second lens element 120 is CT2, and they satisfy the following relation: SAG22/CT2=−0.21.

In the first embodiment of the present imaging lens system, the focal length of the imaging lens system is f, half of the maximal field of view is HFOV, and they satisfy the following relation: f/tan(HFOV)=4.51 mm.

In the first embodiment of the present imaging lens system, an axial distance between the stop 100 and the image-side surface 122 of the second lens element 120 is SD, an axial distance between the object-side surface 111 of the first lens element 110 and the image-side surface 122 of the second lens element 120 is TD, and they satisfy the following relation: SD/TD=0.97.

In the first embodiment of the present imaging lens system, an axial distance between the object-side surface 111 of the first lens element 110 and the image-side surface 122 of the second lens element 120 is TD, a maximal image height of the imaging lens system is ImgH, which is also defined here as half of a diagonal length of an effective photosensitive area of an image sensor, and they satisfy the following relation: TD/ImgH=1.39.

Embodiment 2

Figure 2A:
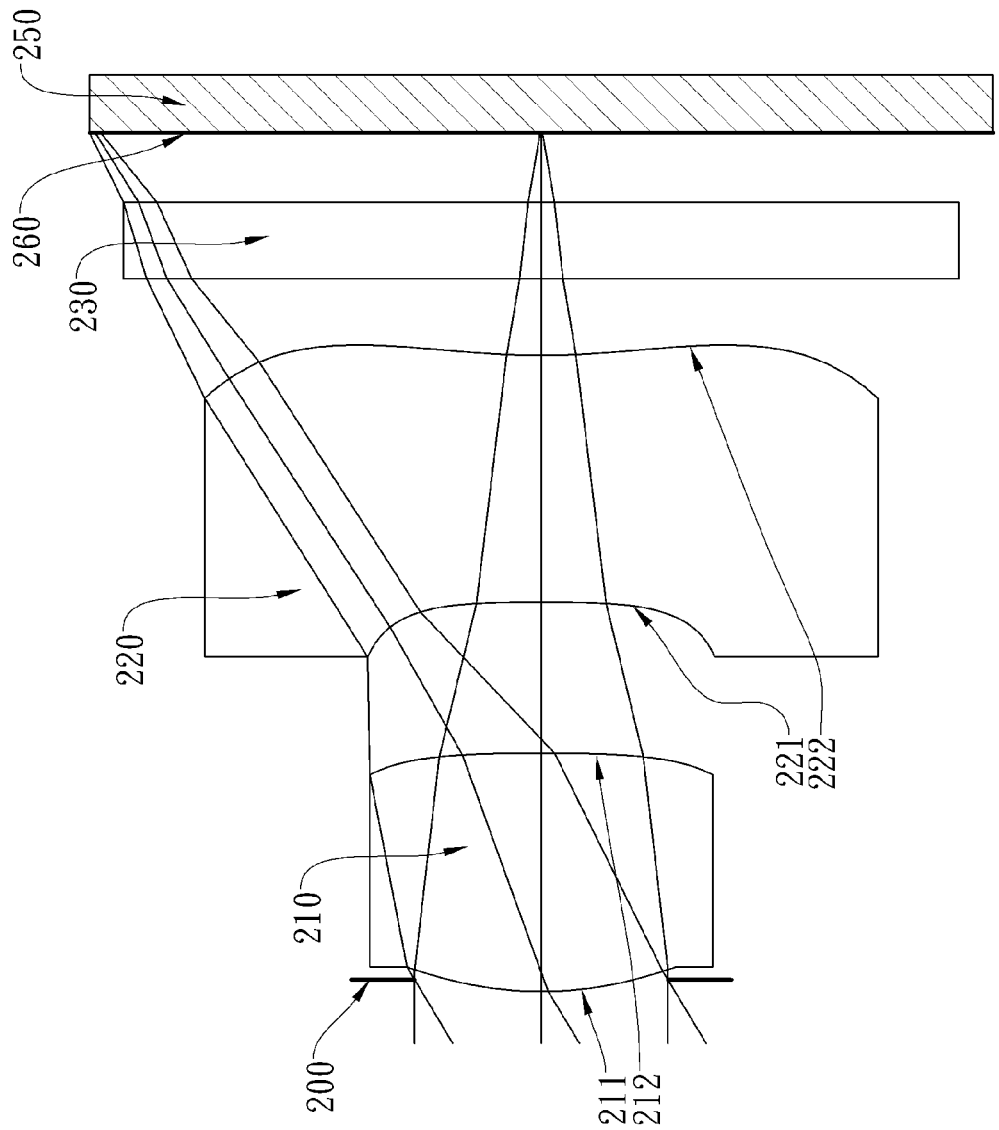
FIG. 2A shows an imaging lens system in accordance with a second embodiment of the present invention.
Figure 2B:
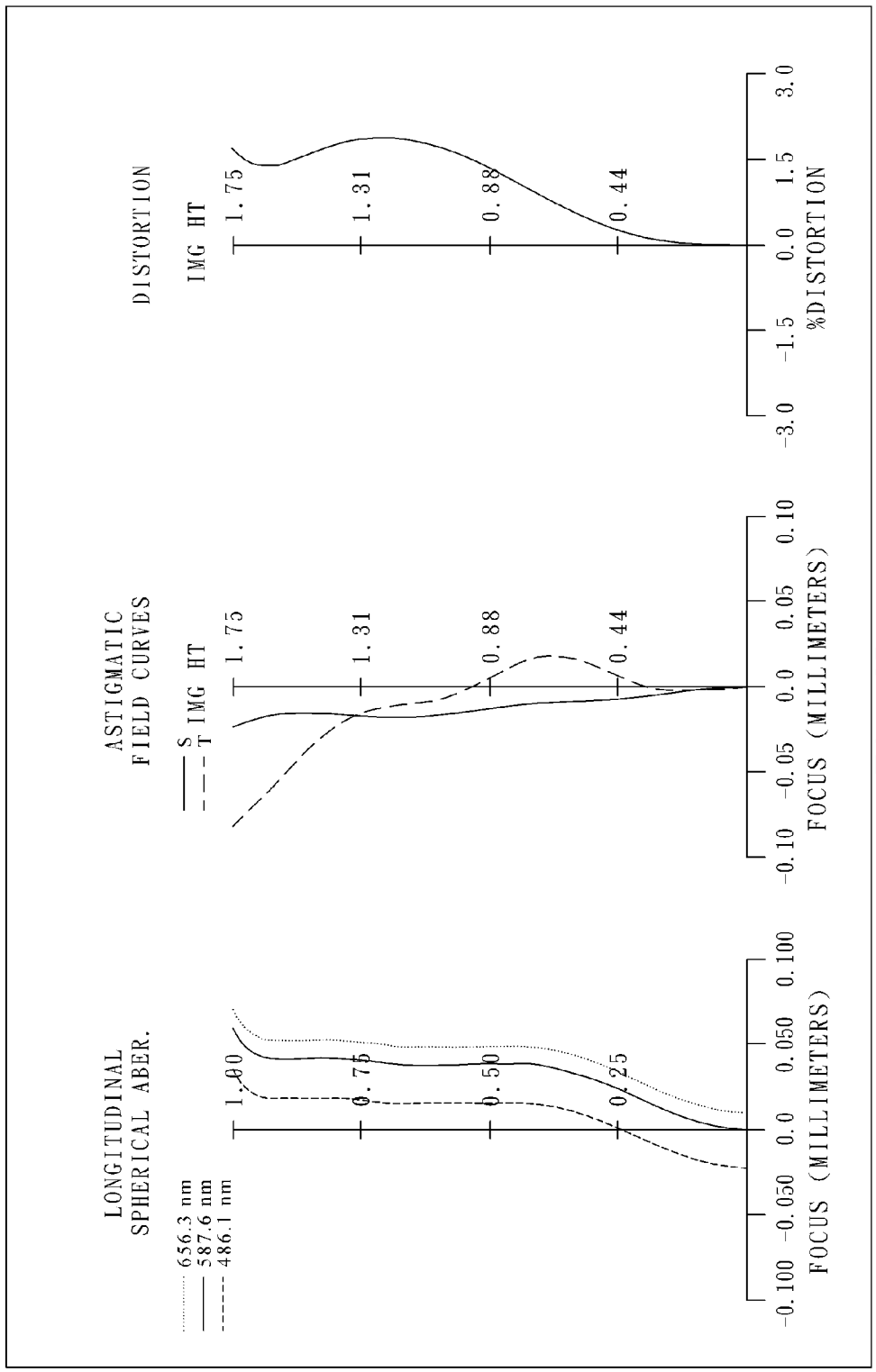
FIG. 2B shows the aberration curves of the second embodiment of the present invention.

FIG. 2A shows an imaging lens system in accordance with the second embodiment of the present invention, and FIG. 2B shows the aberration curves of the second embodiment of the present invention. The imaging lens system of the second embodiment of the present invention mainly comprises two non-cemented lens elements, in order from an object side to an image side:

a plastic first lens element 210 with positive refractive power having a convex object-side surface 211 and a convex image-side surface 212, the object-side and image-side surfaces 211 and 212 thereof being aspheric; and a plastic second lens element 220 with negative refractive power having a concave object-side surface 221 and a concave image-side surface 222, the object-side and image-side surfaces 221 and 222 thereof being aspheric; wherein the shape of the image-side surface 222 of the second lens element 220 changes from concave when near an optical axis to convex when away from the optical axis;

wherein an aperture stop 200 is disposed between an imaged object and the first lens element 210;

the imaging lens system further comprises a IR cut-filter 230 disposed between the image-side surface 222 of the second lens element 220 and an image plane 260; the filter 230 is made of glass and has no influence on the focal length of the imaging lens system; the imaging lens system further comprises an image sensor 250 provided on the image plane 260.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.83 mm, Fno = 2.85, HFOV = 31.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.046 | | | | |
| 2 | Lens 1 | 1.387 | ASP | 0.936 | Plastic | 1.544 | 55.9 | 2.29 |
| 3 | | −9.389 | ASP | 0.593 | | | | |
| 4 | Lens 2 | −12.545 | ASP | 0.970 | Plastic | 1.640 | 23.3 | −3.58 |
| 5 | | 2.885 | ASP | 0.300 | | | | |
| 6 | IR-filter | Plano | | 0.300 | Glass | 1.517 | 64.2 | — |
| 7 | | Plano | | 0.274 | | | | |
| 8 | Image | Plano | | — | | | | |

\* Reference wavelength for Focal length and Index calculation is 587.6 nm

TABLE 4

Aspheric Coefficients

| Surface # | 2 | 3 | 4 | 5 |
|---|---|---|---|---|
| k = | −2.6563E−01 | −1.2399E+01 | −1.0000E+00 | −6.0659E+00 |
| A4 = | −1.7013E−01 | −2.2112E−01 | −4.7809E−01 | −2.1278E−01 |
| A6 = | 1.5627E+00 | 1.3543E−01 | −1.2269E+00 | 1.7376E−01 |
| A8 = | −1.0738E+01 | −1.2331E+00 | 9.8278E+00 | −1.9434E−01 |
| A10 = | 3.4784E+01 | 1.9147E+00 | −4.5732E+01 | 1.3690E−01 |
| A12 = | −4.4782E+01 | −1.5103E+00 | 9.7114E+01 | −5.6533E−02 |
| A14 = | | | −8.8882E+01 | 9.9562E−03 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f [mm] | 2.83 | f/f2 | −0.79 |
|---|---|---|---|
| Fno | 2.85 | f1/f2 | −0.64 |
| HFOV [deg.] | 31.0 | f(1/f1 + 1/|f2|) | 2.03 |
| ln(V1/V2) | 0.88 | SAG22/CT2 | −0.17 |
| T12/CT2 | 0.61 | f/tan(HFOV) [mm] | 4.71 |
| (R1 + R2)/(R1 − R2) | −0.74 | SD/TD | 0.98 |
| R4/R3 | −0.23 | TD/ImgH | 1.43 |

Embodiment 3

Figure 3A:
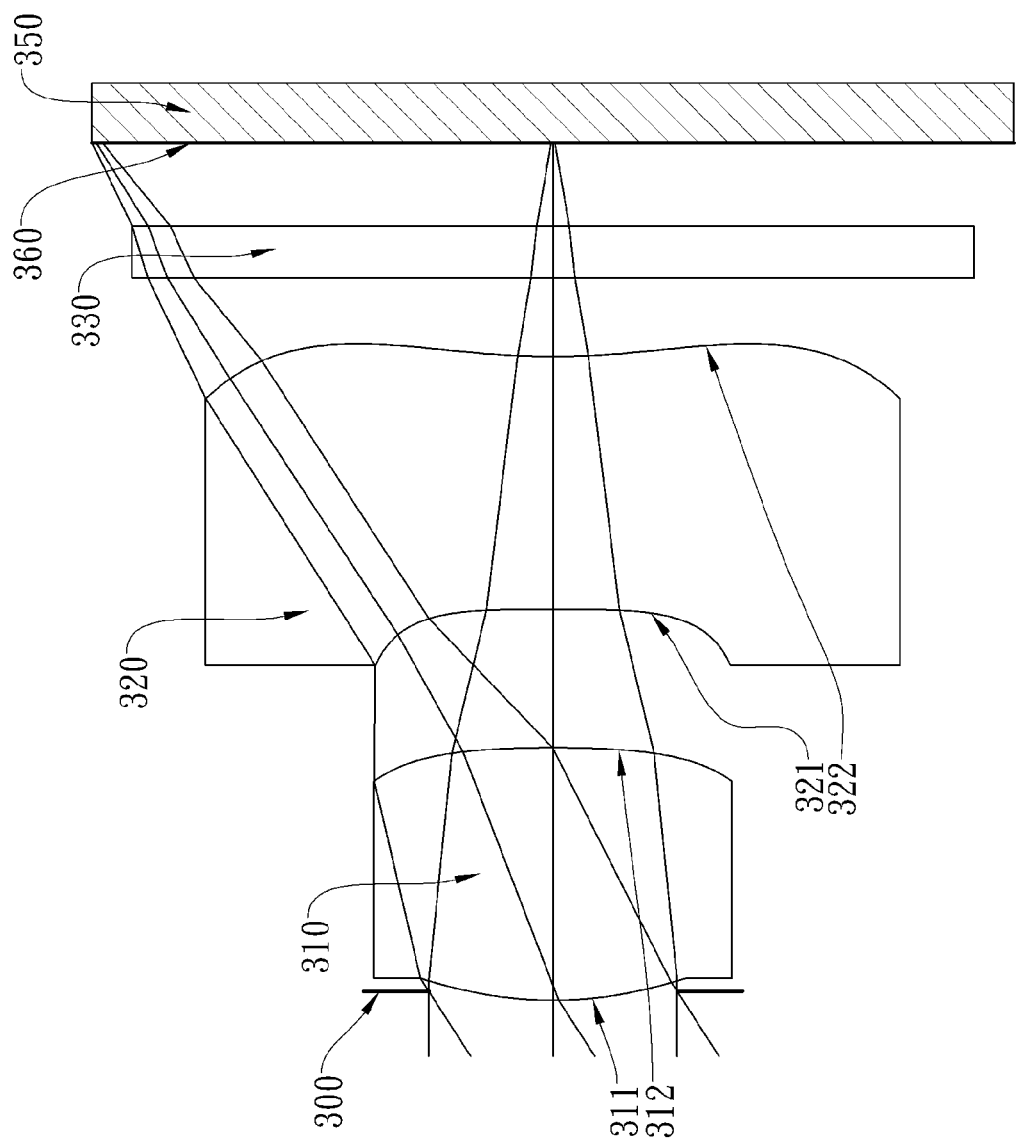
FIG. 3A shows an imaging lens system in accordance with a third embodiment of the present invention.
Figure 3B:
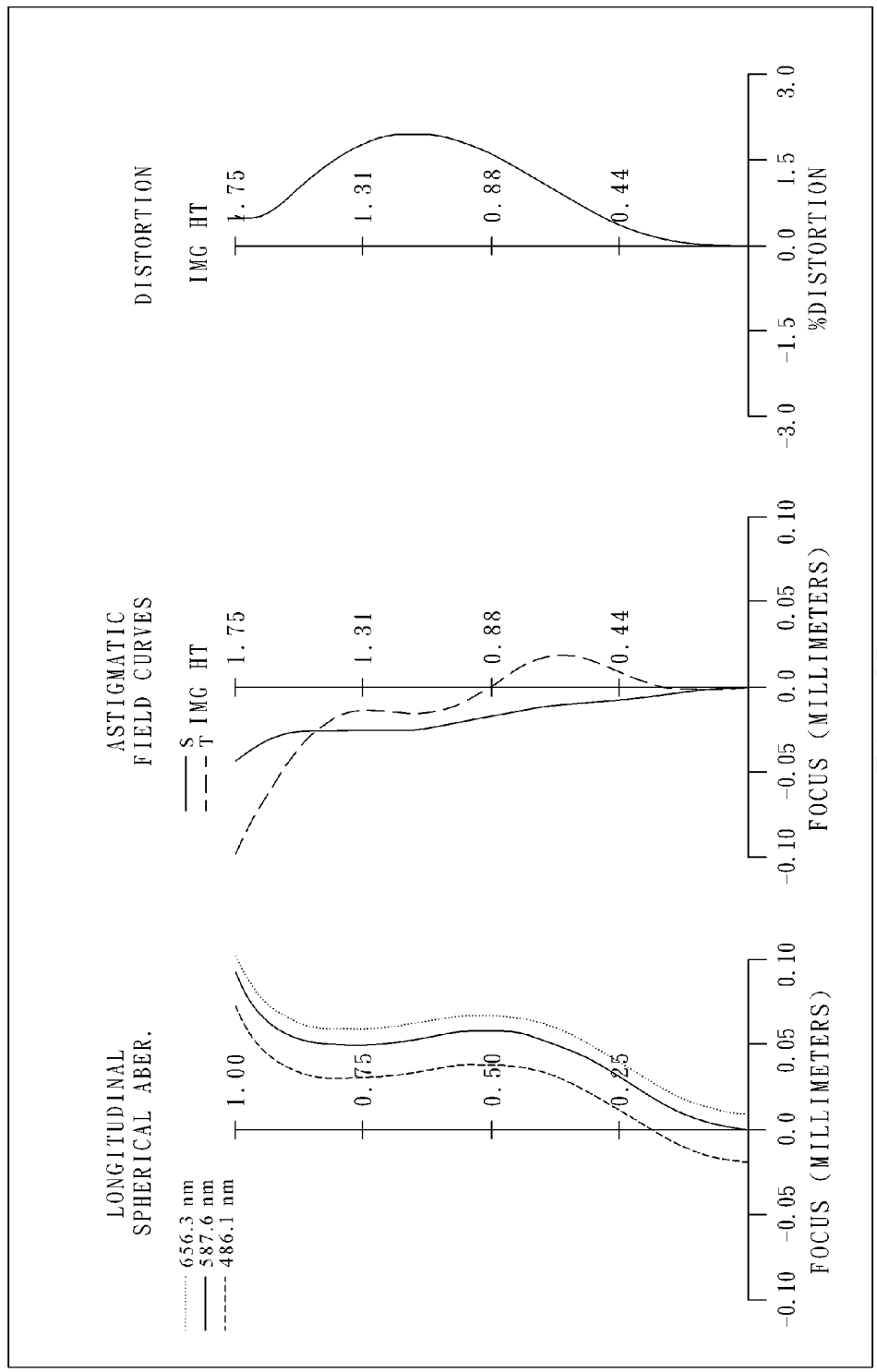
FIG. 3B shows the aberration curves of the third embodiment of the present invention.

FIG. 3A shows an imaging lens system in accordance with the third embodiment of the present invention, and FIG. 3B shows the aberration curves of the third embodiment of the present invention. The imaging lens system of the third embodiment of the present invention mainly comprises two non-cemented lens elements, in order from an object side to an image side:

a plastic first lens element 310 with positive refractive power having a convex object-side surface 311 and a convex image-side surface 312, the object-side and image-side surfaces 311 and 312 thereof being aspheric; and a plastic second lens element 320 with negative refractive power having a concave object-side surface 321 and a concave image-side surface 322, the object-side and image-side surfaces 321 and 322 thereof being aspheric; wherein the shape of the image-side surface 322 of the second lens element 320 changes from concave when near an optical axis to convex when away from the optical axis;

wherein an aperture stop 300 is disposed between an imaged object and the first lens element 310;

the imaging lens system further comprises a IR cut-filter 330 disposed between the image-side surface 322 of the second lens element 320 and an image plane 360; the filter 330 is made of glass and has no influence on the focal length of the imaging lens system; the imaging lens system further comprises an image sensor 350 provided the an image plane 360.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 2.66 mm, Fno = 2.80, HFOV = 32.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.035 | | | | |
| 2 | Lens 1 | 1.419 | ASP | 0.969 | Plastic | 1.530 | 55.8 | 2.20 |

TABLE 6-continued (Embodiment 3)
f = 2.66 mm, Fno = 2.80, HFOV = 32.7 deg.

| Surface # | | Curvature Radius | | Thickness | Material | Index | Abbe # | Focal Length |
|---|---|---|---|---|---|---|---|---|
| 3 | | −5.019 | ASP | 0.531 | | | | |
| 4 | Lens 2 | −23.855 | ASP | 0.969 | Plastic | 1.650 | 21.4 | −3.63 |
| 5 | | 2.656 | ASP | 0.300 | | | | |
| 6 | IR-filter | Plano | | 0.200 | Glass | 1.517 | 64.2 | — |
| 7 | | Plano | | 0.319 | | | | |
| 8 | Image | Plano | | — | | | | |

* Reference wavelength for Focal length and Index calculation is 587.6 nm

TABLE 7

Aspheric Coefficients

| Surface # | 2 | 3 | 4 | 5 |
|---|---|---|---|---|
| k = | −9.4314E−01 | 9.0000E+00 | −1.0000E+00 | −3.5363E+00 |
| A4 = | −2.1873E−01 | −2.8455E−01 | −5.1751E−01 | −2.2062E−01 |
| A6 = | 2.0201E+00 | 2.7400E−01 | −1.2069E+00 | 1.6812E−01 |
| A8 = | −1.1907E+01 | −1.6869E+00 | 9.8236E+00 | −1.8745E−01 |
| A10 = | 3.4829E+01 | 2.3206E+00 | −4.6053E+01 | 1.3442E−01 |
| A12 = | −4.4782E+01 | −1.5103E+00 | 9.7114E+01 | −5.6192E−02 |
| A14 = | | | −8.8882E+01 | 9.8826E−03 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f [mm] | 2.66 | f/f2 | −0.73 |
|---|---|---|---|
| Fno | 2.80 | f1/f2 | −0.61 |
| HFOV [deg.] | 32.7 | f(1/f1 + 1/|f2|) | 1.94 |
| ln(V1/V2) | 0.96 | SAG22/CT2 | −0.17 |
| T12/CT2 | 0.55 | f/tan(HFOV) [mm] | 4.14 |
| (R1 + R2)/(R1 − R2) | −0.56 | SD/TD | 0.99 |
| R4/R3 | −0.11 | TD/ImgH | 1.41 |

Embodiment 4

Figure 4A:
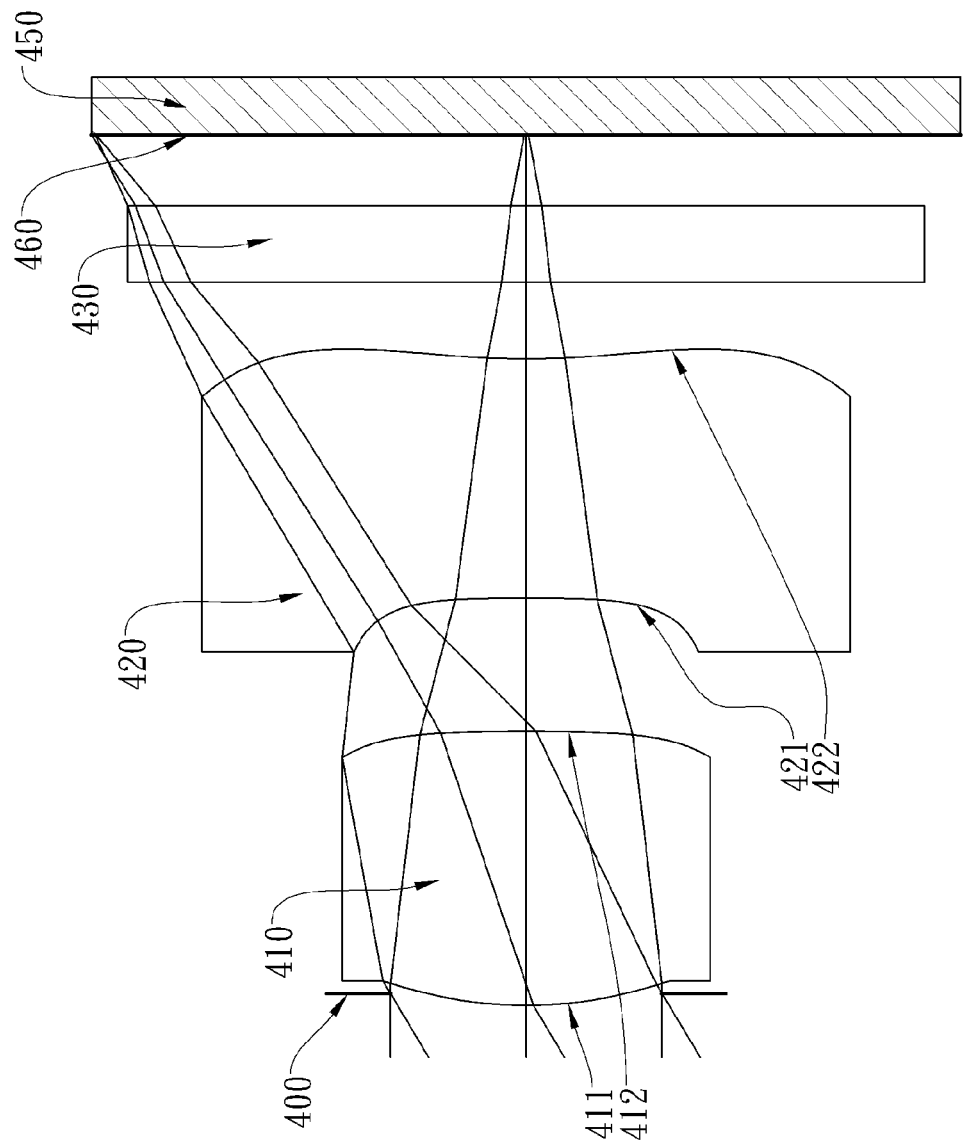
FIG. 4A shows an imaging lens system in accordance with a fourth embodiment of the present invention.
Figure 4B:
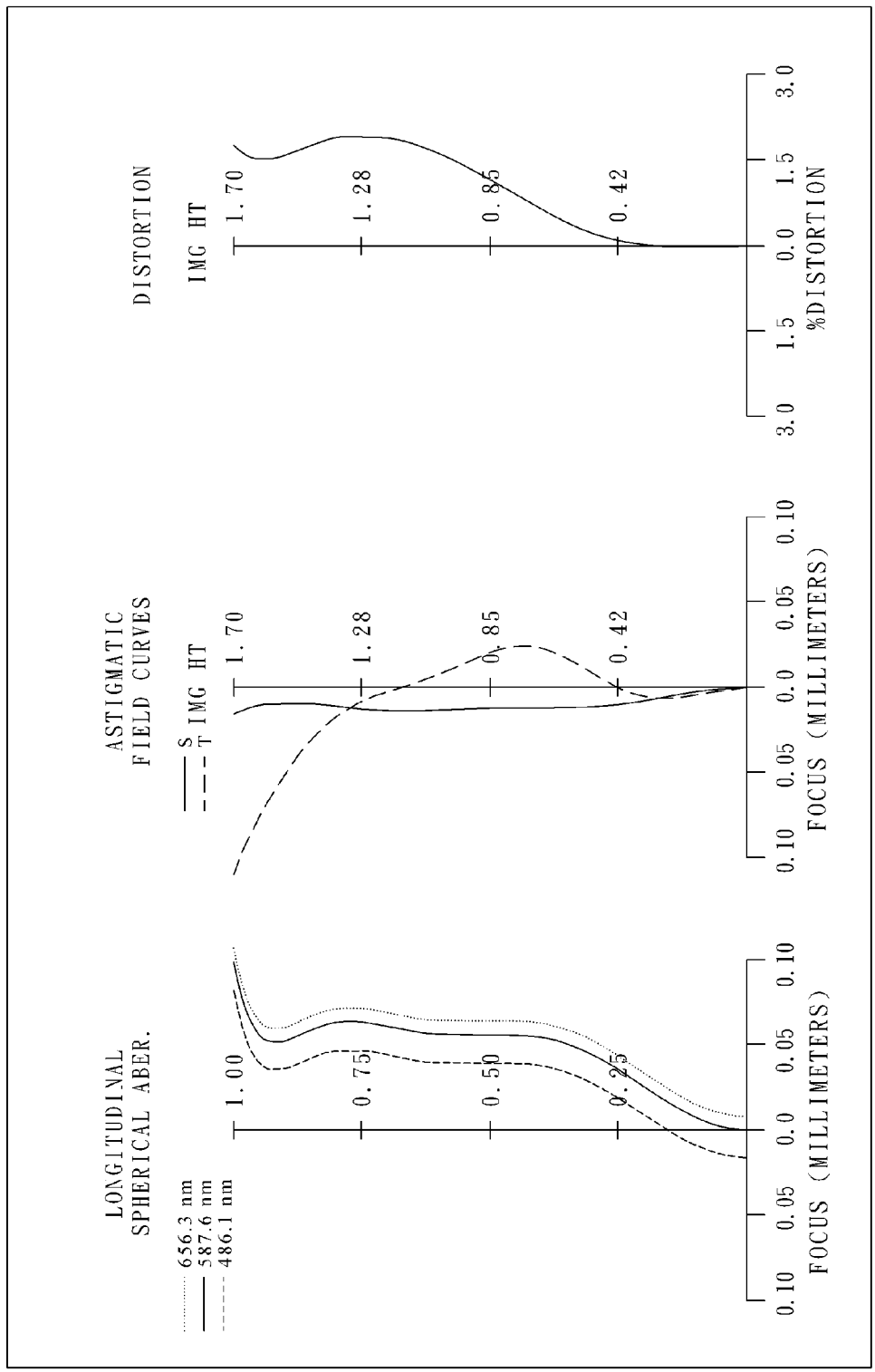
FIG. 4B shows the aberration curves of the fourth embodiment of the present invention.

FIG. 4A shows an imaging lens system in accordance with the fourth embodiment of the present invention, and FIG. 4B shows the aberration curves of the fourth embodiment of the present invention. The imaging lens system of the fourth embodiment of the present invention mainly comprises two non-cemented lens elements, in order from an object side to an image side:

a glass first lens element 410 with positive refractive power having a convex object-side surface 411 and a convex image-side surface 412, the object-side and image-side surfaces 411 and 412 thereof being aspheric; and a plastic second lens element 420 with negative refractive power having a concave object-side surface 421 and a concave image-side surface 422, the object-side and image-side surfaces 421 and 422 thereof being aspheric; wherein the shape of the image-side surface 422 of the second lens element 420 changes from concave when near an optical axis to convex when away from the optical axis;

wherein a stop, can be an aperture stop 400 is disposed between an imaged object and the first lens element 410;

the imaging lens system further comprises a IR cut-filter 430 disposed between the image-side surface 422 of the second lens element 420 and an image plane 460; the filter 430 is made of glass and has no influence on the focal length of the imaging lens system; the imaging lens system further comprises an image sensor 450 provided on the image plane 460.

The detailed optical data of the fourth embodiment is shown in TABLE 9, and the aspheric surface data is shown in TABLE 10 wherein the units of the radius of curvature, the thickness and the focal length are expressed in mm, and HFOV is half of the maximal field of view.

TABLE 9

(Embodiment 4)
f = 2.73 mm, Fno = 2.57, HFOV = 30.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.046 | | | | |
| 2 | Lens 1 | 1.562 | ASP | 1.072 | Glass | 1.632 | 63.8 | 2.28 |
| 3 | | −14.055 | ASP | 0.522 | | | | |
| 4 | Lens 2 | −22.458 | ASP | 0.938 | Plastic | 1.640 | 23.3 | −3.99 |
| 5 | | 2.931 | ASP | 0.300 | | | | |

TABLE 9-continued (Embodiment 4)
f = 2.73 mm, Fno = 2.57, HFOV = 30.9 deg.

| Surface # | | Curvature Radius | Thickness | Material | Index | Abbe # | Focal Length |
|---|---|---|---|---|---|---|---|
| 6 | IR-filter | Plano | 0.300 | Glass | 1.517 | 64.2 | — |
| 7 | | Plano | 0.275 | | | | |
| 8 | Image | Plano | — | | | | |

* Reference wavelength for Focal length and Index calculation is 587.6 nm

TABLE 10

Aspheric Coefficients

| Surface # | 2 | 3 | 4 | 5 |
|---|---|---|---|---|
| k = | −1.3991E−01 | −1.0286E+01 | −1.0000E+00 | −4.4192E+00 |
| A4 = | −1.8472E−01 | −1.9108E−01 | −4.4740E−01 | −2.2656E−01 |
| A6 = | 1.8226E+00 | −1.6319E−02 | −1.6980E+00 | 1.7233E+00 |
| A8 = | −1.1998E+01 | −9.7195E−01 | 1.1432E+01 | −1.8424E−01 |
| A10 = | 3.7215E+01 | 1.8261E+00 | −4.7935E+01 | 1.2943E−01 |
| A12 = | −4.4782E+01 | −1.4591E+00 | 9.6320E+01 | −5.7653E−02 |
| A14 = | | | −8.8882E+01 | 1.1441E−02 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 2.73 | f/f2 | −0.68 |
|---|---|---|---|
| Fno | 2.57 | f1/f2 | −0.57 |
| HFOV [deg.] | 30.9 | f(1/f1 + 1/|f2|) | 1.88 |
| ln(V1/V2) | 1.01 | SAG22/CT2 | −0.16 |
| T12/CT2 | 0.56 | f/tan(HFOV) [mm] | 4.56 |
| (R1 + R2)/(R1 − R2) | −0.80 | SD/TD | 0.98 |
| R4/R3 | −0.13 | TD/ImgH | 1.49 |

Embodiment 5

Figure 5A:
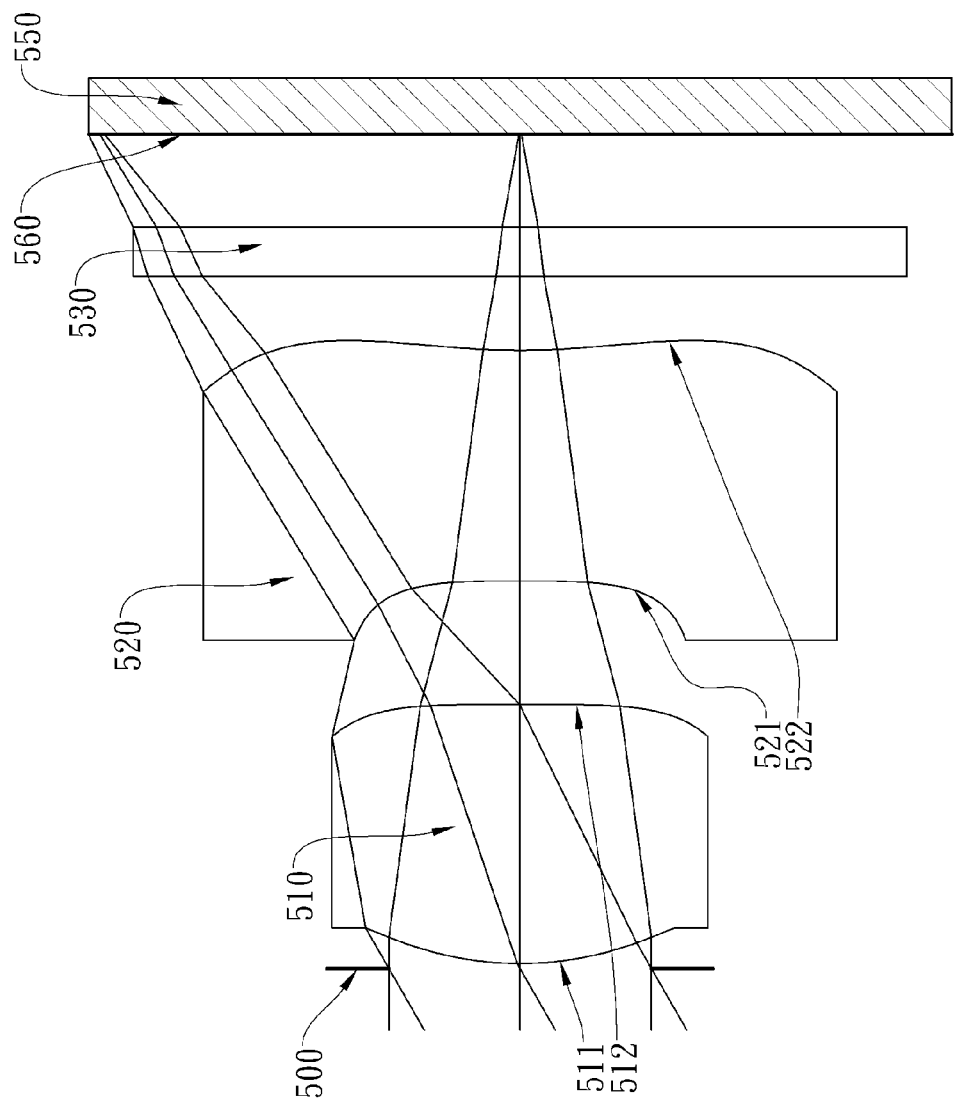
FIG. 5A shows an imaging lens system in accordance with a fifth embodiment of the present invention.
Figure 5B:
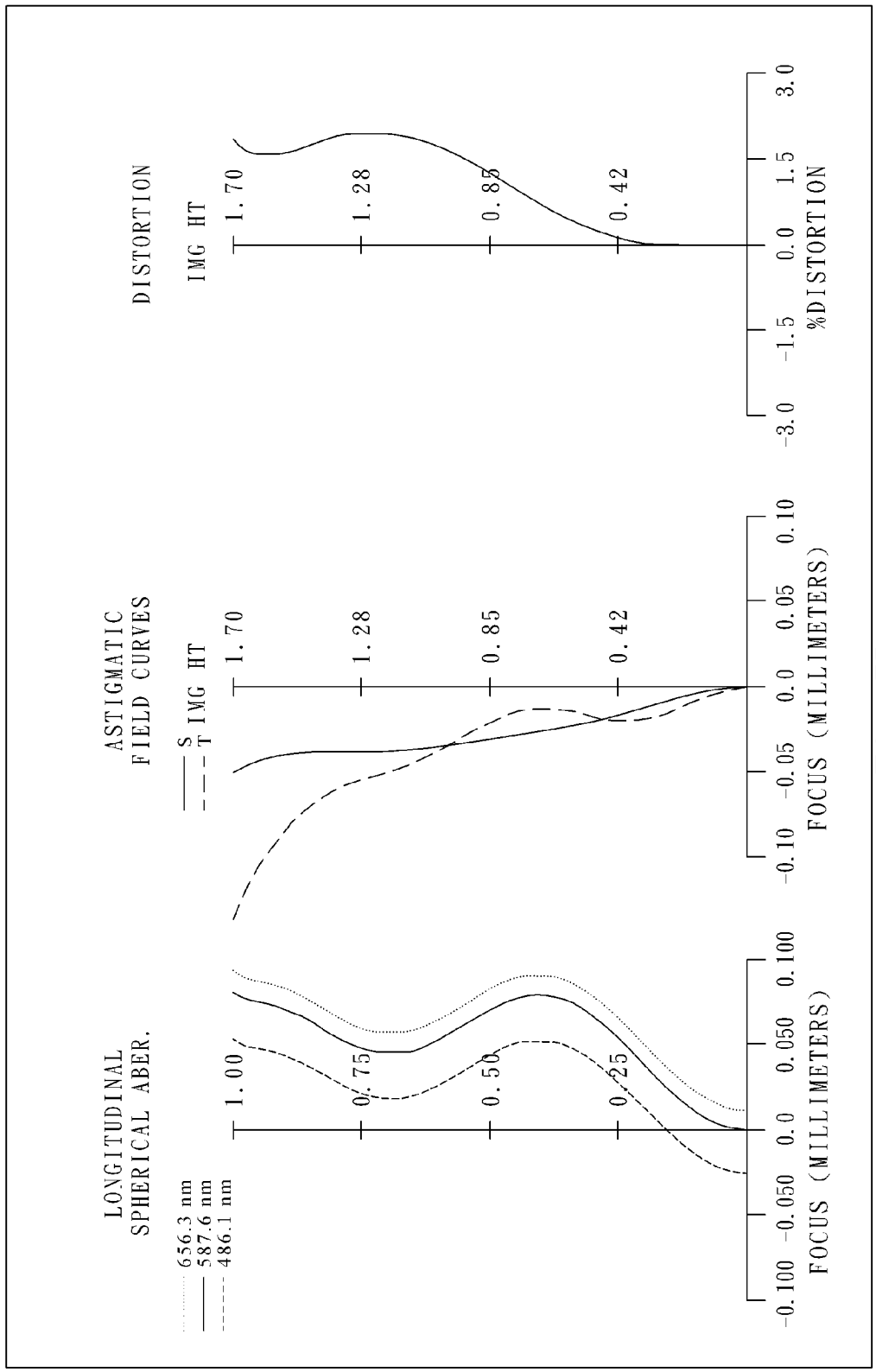
FIG. 5B shows the aberration curves of the fifth embodiment of the present invention.

FIG. 5A shows an imaging lens system in accordance with the fifth embodiment of the present invention, and FIG. 5B shows the aberration curves of the fifth embodiment of the present invention. The imaging lens system of the fifth embodiment of the present invention mainly comprises two non-cemented lens elements, in order from an object side to an image side:

a plastic first lens element 510 with positive refractive power having a convex object-side surface 511 and a convex image-side surface 512, the object-side and image-side surfaces 511 and 512 thereof being aspheric; and a plastic second lens element 520 with negative refractive power having a concave object-side surface 521 and a concave image-side surface 522, the object-side and image-side surfaces 521 and 522 thereof being aspheric; wherein the shape of the image-side surface 522 of the second lens element 520 changes from concave when near an optical axis to convex when away from the optical axis;

wherein an aperture stop 500 is disposed between an imaged object and the first lens element 510;

the imaging lens system further comprises a IR cut-filter 530 disposed between the image-side surface 522 of the second lens element 520 and an image plane 560; the filter 530 is made of glass and has no influence on the focal length of the imaging lens system; the imaging lens system further comprises an image sensor 550 provided on the image plane 560.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 2.86 mm, Fno = 2.69, HFOV = 29.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.020 | | | | |
| 2 | Lens 1 | 1.294 | ASP | 1.050 | Plastic | 1.544 | 55.9 | 2.34 |
| 3 | | −53.476 | ASP | 0.499 | | | | |
| 4 | Lens 2 | −14.749 | ASP | 0.934 | Plastic | 1.607 | 26.6 | −3.80 |
| 5 | | 2.797 | ASP | 0.300 | | | | |
| 6 | IR-filter | Plano | | 0.200 | Glass | 1.517 | 64.2 | — |

TABLE 12-continued (Embodiment 5)
f = 2.86 mm, Fno = 2.69, HFOV = 29.8 deg.

| Surface # | | Curvature Radius | Thickness | Material | Index | Abbe # | Focal Length |
|---|---|---|---|---|---|---|---|
| 7 | | Plano | 0.375 | | | | |
| 8 | Image | Plano | — | | | | |

* Reference wavelength for Focal length and Index calculation is 587.6 nm

TABLE 13

Aspheric Coefficients

| Surface # | 2 | 3 | 4 | 5 |
|---|---|---|---|---|
| k = | −4.2230E−01 | 9.0000E+00 | −1.0000E+00 | 2.5512E+00 |
| A4 = | −2.7253E−01 | −2.7671E−01 | −4.7833E−01 | −2.7214E−01 |
| A6 = | 2.8504E+00 | 3.6650E−01 | −1.8352E+00 | 1.6239E−01 |
| A8 = | −1.5369E+01 | −1.7596E+00 | 1.1496E+01 | −1.7816E−01 |
| A10 = | 3.8331E+01 | 1.9946E+00 | −4.8639E+01 | 1.2876E−01 |
| A12 = | −3.7060E+01 | −9.8510E−01 | 1.0047E+02 | −5.9987E−02 |
| A14 = | | | −9.8837E+01 | 1.2140E−02 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f [mm] | 2.86 | f/f2 | −0.75 |
|---|---|---|---|
| Fno | 2.69 | f1/f2 | −0.62 |
| HFOV [deg.] | 29.8 | f(1/f1 + 1/|f2|) | 1.98 |
| ln(V1/V2) | 0.74 | SAG22/CT2 | −0.18 |
| T12/CT2 | 0.53 | f/tan(HFOV) [mm] | 4.99 |
| (R1 + R2)/(R1 − R2) | −0.95 | SD/TD | 1.01 |
| R4/R3 | −0.19 | TD/ImgH | 1.46 |

Embodiment 6

Figure 6A:
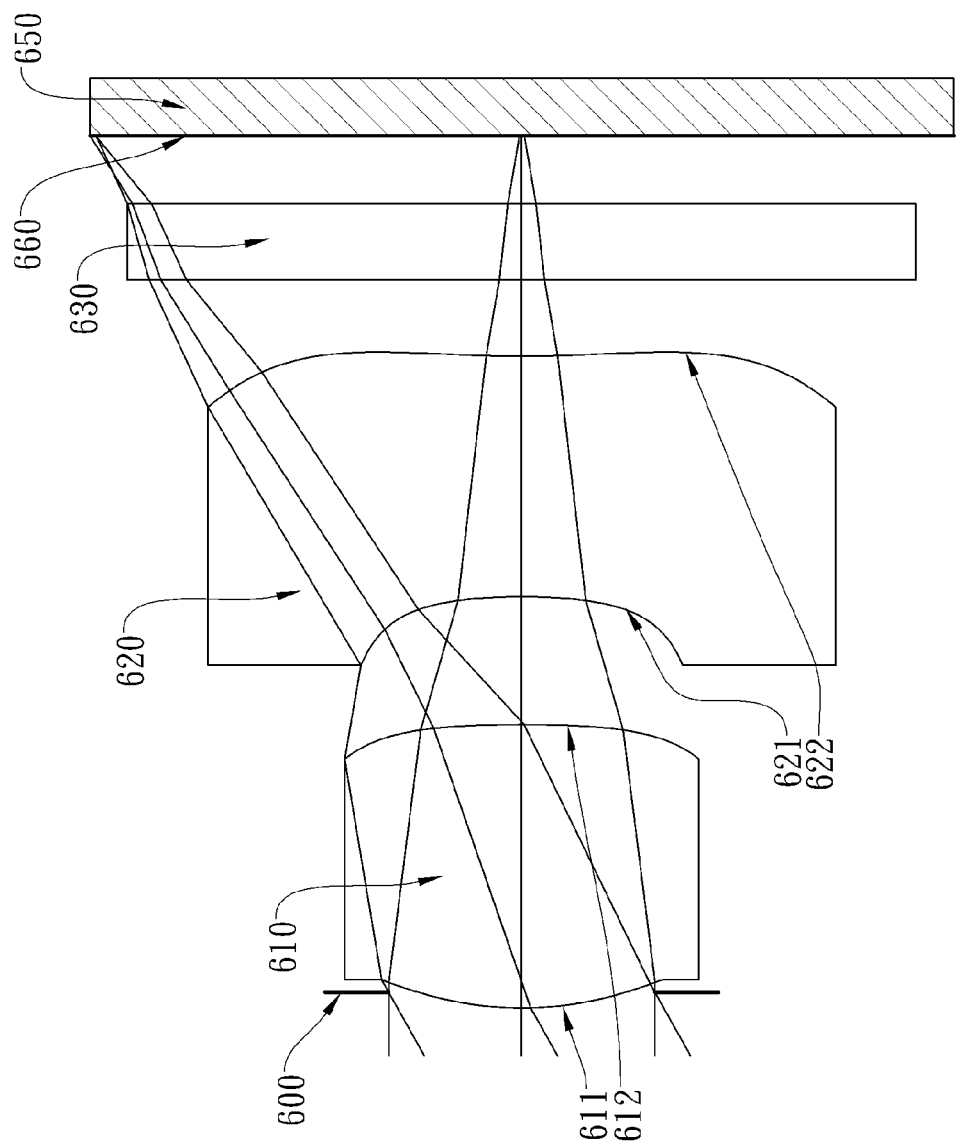
FIG. 6A shows an imaging lens system in accordance with a sixth embodiment of the present invention.
Figure 6B:
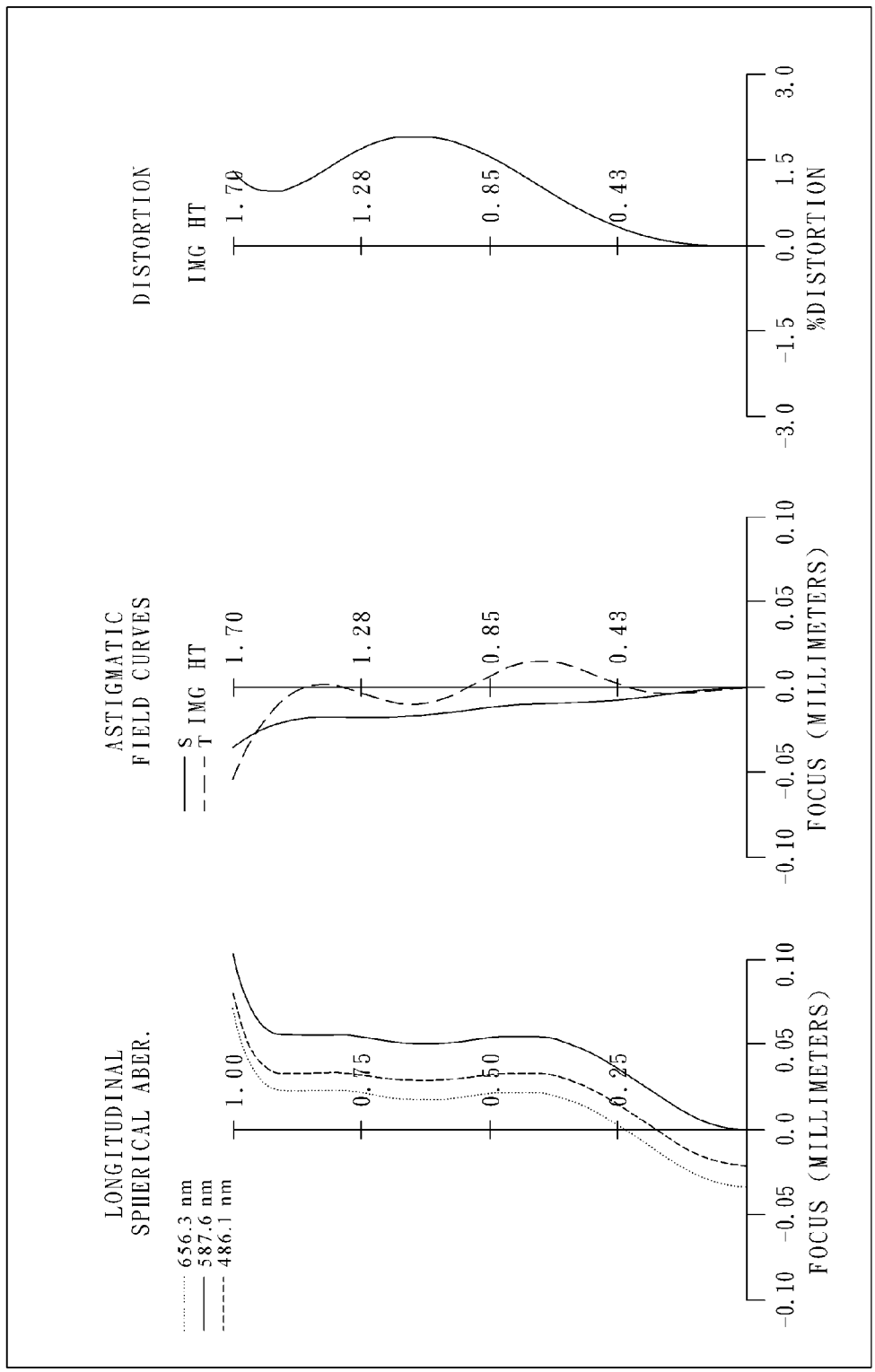
FIG. 6B shows the aberration curves of the sixth embodiment of the present invention.

FIG. 6A shows an imaging lens system in accordance with the sixth embodiment of the present invention, and FIG. 6B shows the aberration curves of the sixth embodiment of the present invention. The imaging lens system of the sixth embodiment of the present invention mainly comprises two non-cemented lens elements, in order from an object side to an image side:

a plastic first lens element 610 with positive refractive power having a convex object-side surface 611 and a convex image-side surface 612, the object-side and image-side surfaces 611 and 612 thereof being aspheric; and a plastic second lens element 620 with negative refractive power having a concave object-side surface 621 and a concave image-side surface 622, the object-side and image-side surfaces 621 and 622 thereof being aspheric; wherein the shape of the image-side surface 622 of the second lens element 620 changes from concave when near an optical axis to convex when away from the optical axis;

wherein an aperture stop 600 is disposed between an imaged object and the first lens element 610;

the imaging lens system further comprises a IR cut-filter 630 disposed between the image-side surface 622 of the second lens element 620 and an image plane 660; the filter 630 is made of glass and has no influence on the focal length of the imaging lens system; the imaging lens system further comprises an image sensor 650 provided on the image plane 660.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 2.94 mm, Fno = 2.80, HFOV = 29.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.061 | | | | |
| 2 | Lens 1 | 1.325 | ASP | 1.117 | Plastic | 1.544 | 55.9 | 2.08 |
| 3 | | −5.516 | ASP | 0.503 | | | | |
| 4 | Lens 2 | −2.815 | ASP | 0.949 | Plastic | 1.640 | 23.3 | −2.59 |
| 5 | | 4.542 | ASP | 0.300 | | | | |
| 6 | IR-filter | Plano | | 0.300 | Glass | 1.517 | 64.2 | — |

TABLE 15-continued (Embodiment 6)
f = 2.94 mm, Fno = 2.80, HFOV = 29.3 deg.

| Surface # | | Curvature Radius | Thickness | Material | Index | Abbe # | Focal Length |
|---|---|---|---|---|---|---|---|
| 7 | | Plano | 0.269 | | | | |
| 8 | Image | Plano | — | | | | |

* Reference wavelength for Focal length and Index calculation is 587.6 nm

TABLE 16

Aspheric Coefficients

| Surface # | 2 | 3 | 4 | 5 |
|---|---|---|---|---|
| k = | −4.1417E−01 | 4.4062E+00 | −1.0000E+00 | −1.3814E+01 |
| A4 = | −1.8979E−01 | −2.5535E−01 | −5.7973E−01 | −2.0125E−01 |
| A6 = | 1.9255E+00 | 1.5954E−01 | −1.7336E+00 | 1.5160E−01 |
| A8 = | −1.2333E+01 | −1.7513E+00 | 1.1642E+01 | −1.8667E−01 |
| A10 = | 3.7331E+01 | 2.5579E+00 | −5.2907E+01 | 1.3224E−01 |
| A12 = | −4.4782E+01 | −1.5103E+00 | 9.7114E+01 | −5.6527E−02 |
| A14 = | | | −8.8882E+01 | 1.1496E−02 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f [mm] | 2.94 | f/f2 | −1.14 |
|---|---|---|---|
| Fno | 2.80 | f1/f2 | −0.81 |
| HFOV [deg.] | 29.3 | f(1/f1 + 1/|f2|) | 2.54 |
| ln(V1/V2) | 0.88 | SAG22/CT2 | −0.21 |
| T12/CT2 | 0.53 | f/tan(HFOV) [mm] | 5.24 |
| (R1 + R2)/(R1 − R2) | −0.61 | SD/TD | 0.98 |
| R4/R3 | −1.61 | TD/ImgH | 1.51 |

Embodiment 7

Figure 7A:
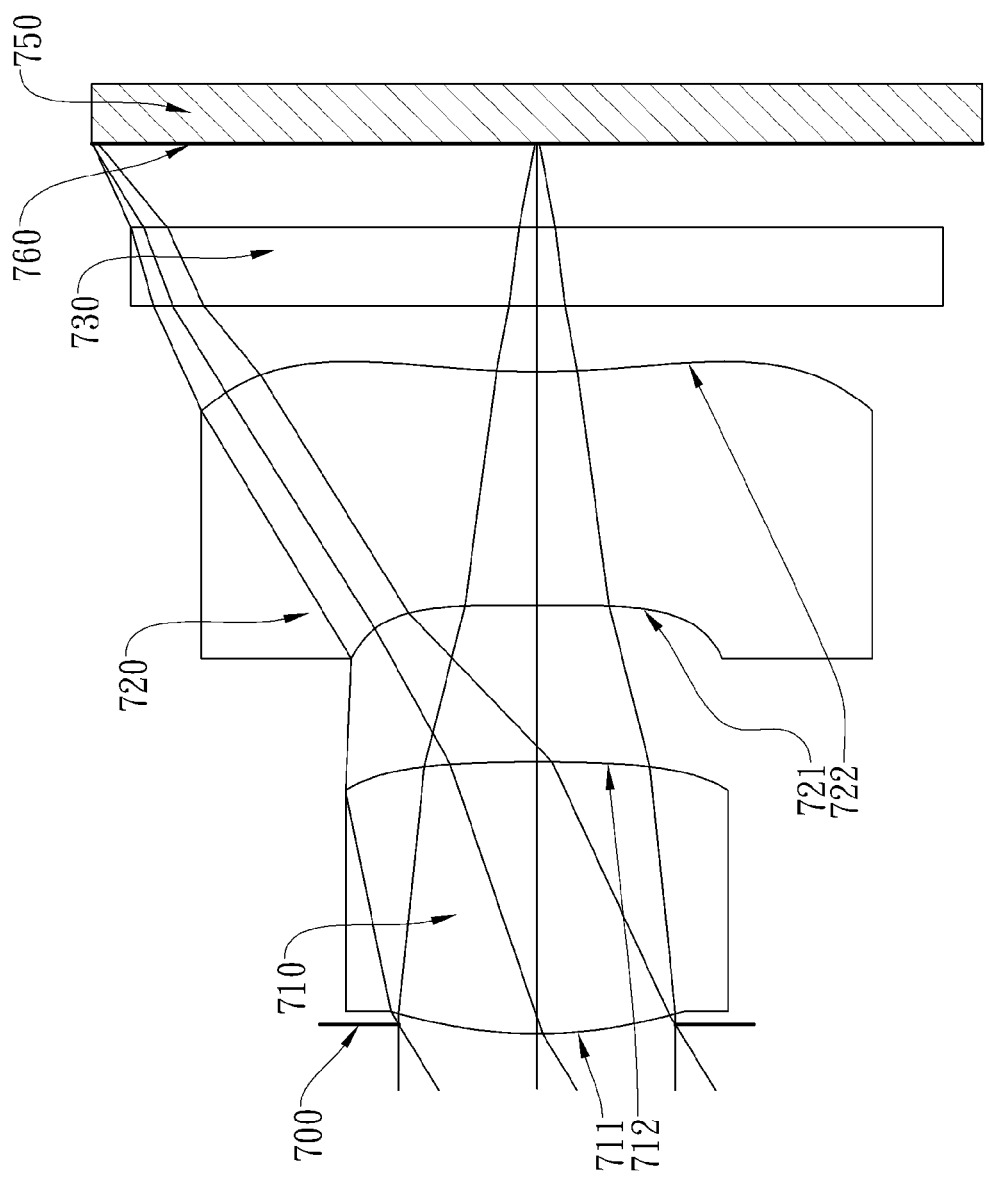
FIG. 7A shows an imaging lens system in accordance with a seventh embodiment of the present invention.
Figure 7B:
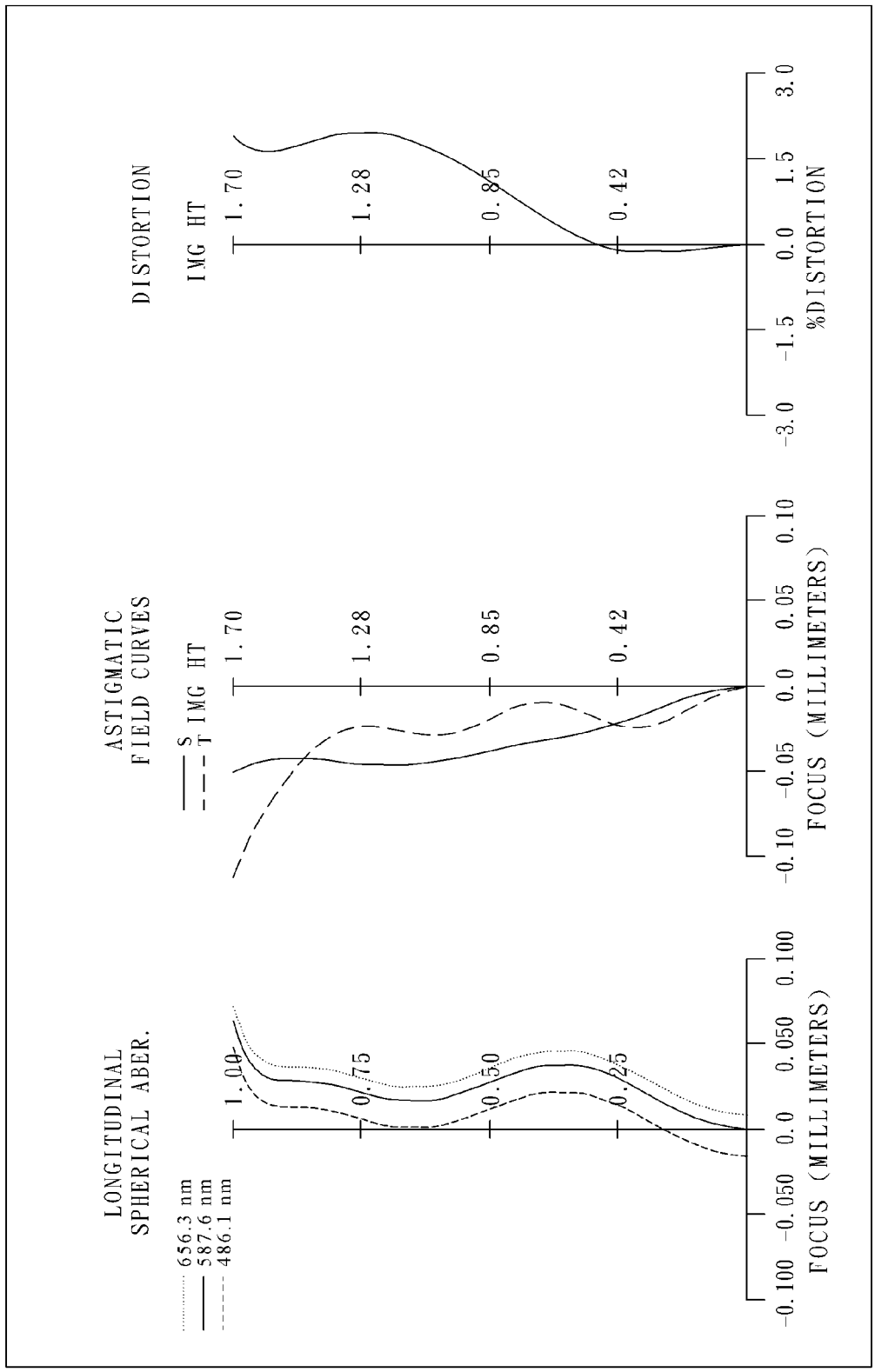
FIG. 7B shows the aberration curves of the seventh embodiment of the present invention.

FIG. 7A shows an imaging lens system in accordance with the seventh embodiment of the present invention, and FIG. 7B shows the aberration curves of the seventh embodiment of the present invention. The imaging lens system of the seventh embodiment of the present invention mainly comprises two non-cemented lens elements, in order from an object side to an image side:

a glass first lens element 710 with positive refractive power having a convex object-side surface 711 and a convex image-side surface 712, the object-side and image-side surfaces 711 and 712 thereof being aspheric; and a plastic second lens element 720 with negative refractive power having a concave object-side surface 721 and a concave image-side surface 722, the object-side and image-side surfaces 721 and 722 thereof being aspheric; wherein the shape of the image-side surface 722 of the second lens element 720 changes from concave when near an optical axis to convex when away from the optical axis;

wherein an aperture stop 700 is disposed between an imaged object and the first lens element 710;

the imaging lens system further comprises a IR cut-filter 730 disposed between the image-side surface 722 of the second lens element 720 and an image plane 760; the filter 730 is made of glass and has no influence on the focal length of the imaging lens system; the imaging lens system further comprises an image sensor 750 provided on the image plane 760.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 2.71 mm, Fno = 2.57, HFOV = 31.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.036 | | | | |
| 2 | Lens 1 | 1.702 | ASP | 1.039 | Glass | 1.632 | 63.8 | 2.33 |
| 3 | | −8.265 | ASP | 0.598 | | | | |
| 4 | Lens 2 | −100.000 | ASP | 0.893 | Plastic | 1.650 | 21.4 | −4.57 |
| 5 | | 3.071 | ASP | 0.250 | | | | |
| 6 | IR-filter | Plano | | 0.300 | Glass | 1.517 | 64.2 | — |

TABLE 18-continued (Embodiment 7)
f = 2.71 mm, Fno = 2.57, HFOV = 31.4 deg.

| Surface # | | Curvature Radius | Thickness | Material | Index | Abbe # | Focal Length |
|---|---|---|---|---|---|---|---|
| 7 | | Plano | 0.321 | | | | |
| 8 | Image | Plano | — | | | | |

\* Reference wavelength for Focal length and Index calculation is 587.6 nm

TABLE 19

| | Aspheric Coefficients | | | |
|---|---|---|---|---|
| Surface # | 2 | 3 | 4 | 5 |
| k = | 2.7697E−01 | −3.0000E+01 | −1.0000E+00 | 1.7171E+00 |
| A4 = | −2.0635E−01 | −2.0594E−01 | −3.0661E−01 | −2.2583E−01 |
| A6 = | 2.0389E+00 | 2.0228E−01 | −2.0584E+00 | 1.5342E−01 |
| A8 = | −1.3263E+01 | −1.4088E+00 | 1.2897E+01 | −1.8963E−01 |
| A10 = | 3.9149E+01 | 2.3501E+00 | −4.8040E+01 | 1.3839E−01 |
| A12 = | −4.4747E+01 | −1.6112E+00 | 8.6375E+01 | −5.8256E−02 |
| A14 = | | | −6.6689E+01 | 1.0472E−02 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f [mm] | 2.71 | f/f2 | −0.59 |
|---|---|---|---|
| Fno | 2.57 | f1/f2 | −0.51 |
| HFOV [deg.] | 31.4 | f(1/f1 + 1/|f2|) | 1.76 |
| ln(V1/V2) | 1.09 | SAG22/CT2 | −0.17 |
| T12/CT2 | 0.67 | f/tan(HFOV) [mm] | 4.44 |
| (R1 + R2)/(R1 − R2) | −0.66 | SD/TD | 0.99 |
| R4/R3 | −0.03 | TD/ImgH | 1.49 |

Embodiment 8

Figure 8A:
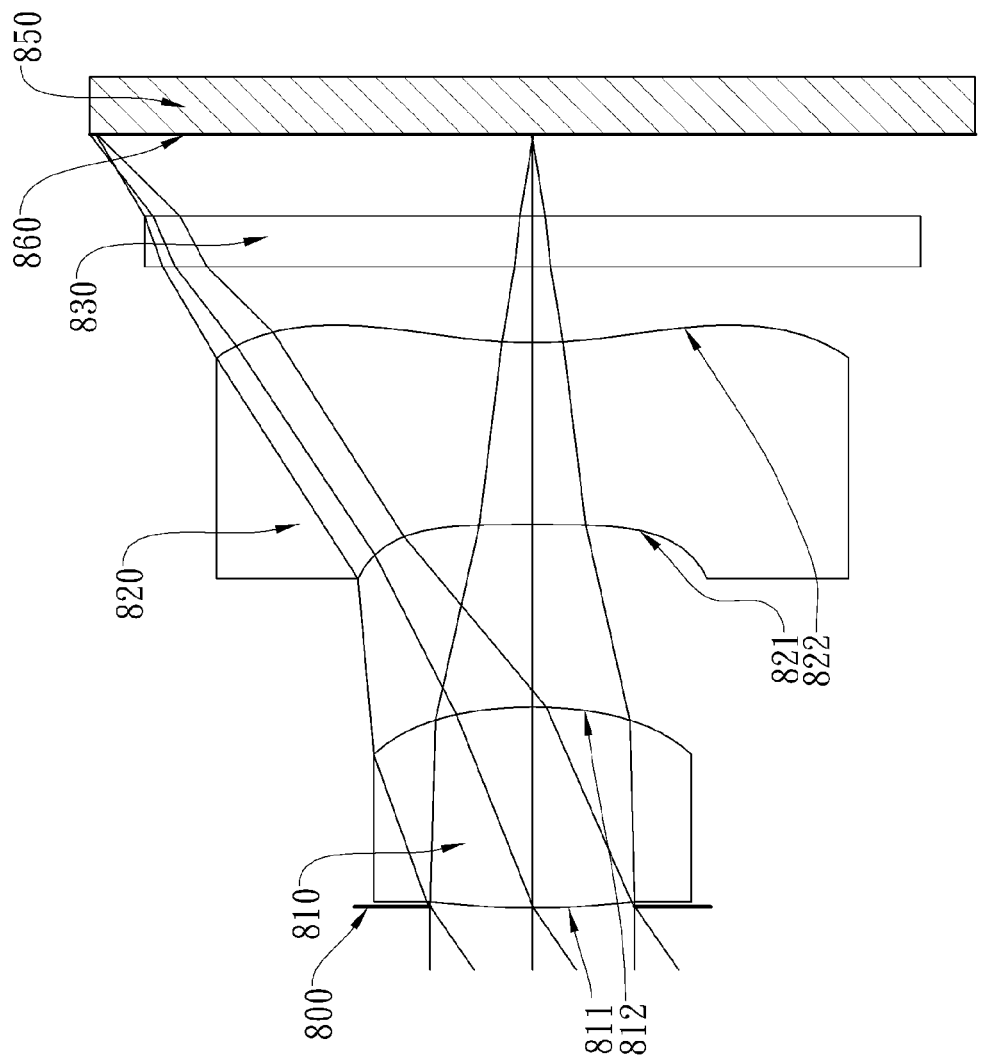
FIG. 8A shows an imaging lens system in accordance with an eighth embodiment of the present invention.
Figure 8B:
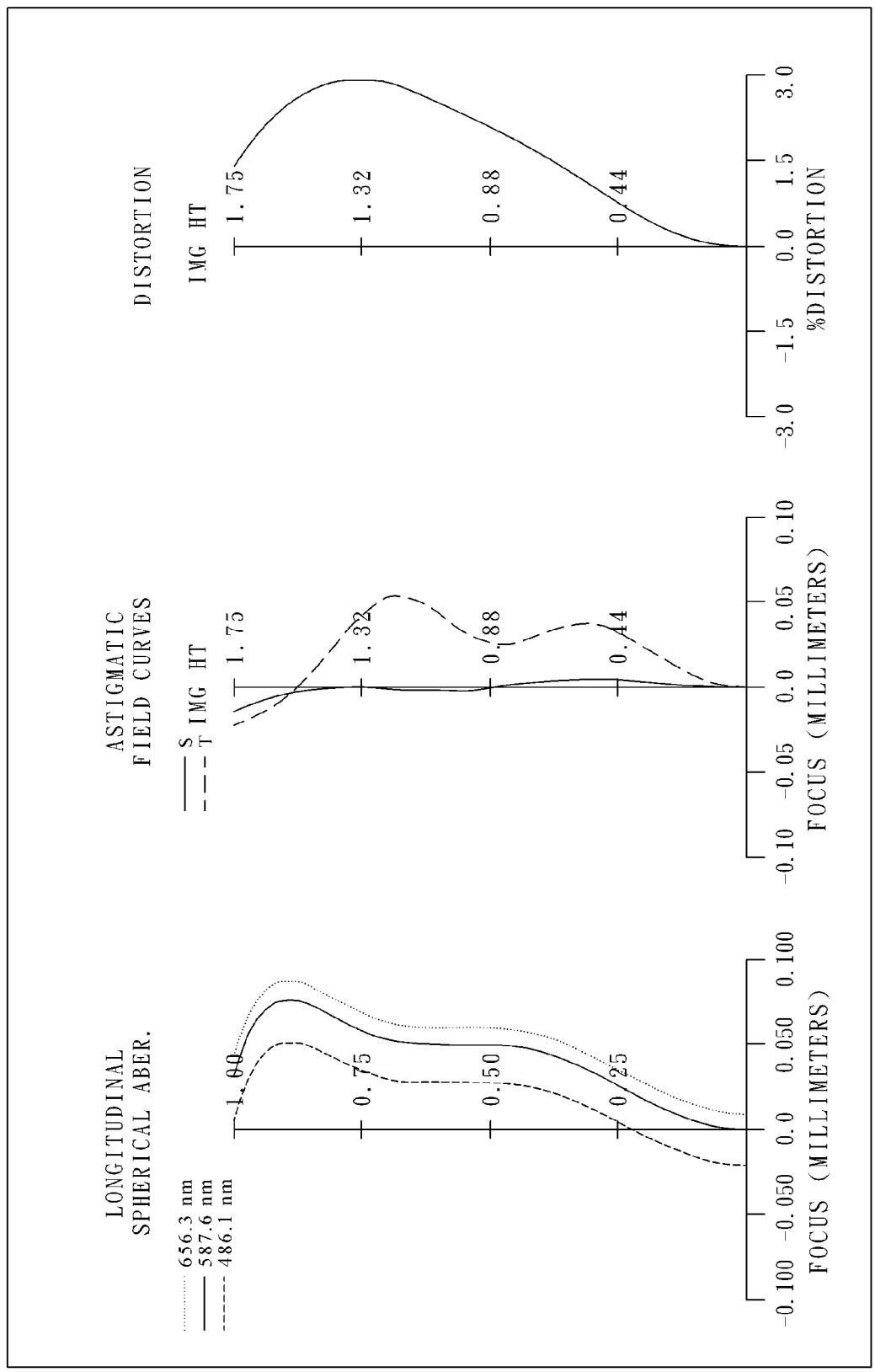
FIG. 8B shows the aberration curves of the eighth embodiment of the present invention.

FIG. 8A shows an imaging lens system in accordance with the eighth embodiment of the present invention, and FIG. 8B shows the aberration curves of the eighth embodiment of the present invention. The imaging lens system of the eighth embodiment of the present invention mainly comprises two non-cemented lens elements, in order from an object side to an image side:

a plastic first lens element 810 with positive refractive power having a convex object-side surface 811 and a convex image-side surface 812, the object-side and image-side surfaces 811 and 812 thereof being aspheric; and a plastic second lens element 820 with negative refractive power having a concave object-side surface 821 and a concave image-side surface 822, the object-side and image-side surfaces 821 and 822 thereof being aspheric; wherein the shape of the image-side surface 822 of the second lens element 820 changes from concave when near an optical axis to convex when away from the optical axis;

wherein an aperture stop 800 is disposed between an imaged object and the first lens element 810;

the imaging lens system further comprises a IR cut-filter 830 disposed between the image-side surface 822 of the second lens element 820 and an image plane 860; the filter 830 is made of glass and has no influence on the focal length of the imaging lens system; the imaging lens system further comprises an image sensor 850 provided on the image plane 860.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 2.43 mm, Fno = 3.00, HFOV = 34.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.006 | | | | |
| 2 | Lens 1 | 2.458 | ASP | 0.796 | Plastic | 1.544 | 55.9 | 1.94 |
| 3 | | −1.639 | ASP | 0.721 | | | | |
| 4 | Lens 2 | −74.627 | ASP | 0.720 | Plastic | 1.640 | 23.3 | −2.85 |
| 5 | | 1.877 | ASP | 0.300 | | | | |
| 6 | IR-filter | Plano | | 0.200 | Glass | 1.517 | 64.2 | — |

TABLE 21-continued (Embodiment 8)
f = 2.43 mm, Fno = 3.00, HFOV = 34.8 deg.

| Surface # | | Curvature Radius | Thickness | Material | Index | Abbe # | Focal Length |
|---|---|---|---|---|---|---|---|
| 7 | | Plano | 0.323 | | | | |
| 8 | Image | Plano | — | | | | |

* Reference wavelength for Focal length and Index calculation is 587.6 nm

TABLE 22

Aspheric Coefficients

| Surface # | 2 | 3 | 4 | 5 |
|---|---|---|---|---|
| k = | −1.2797E+01 | −4.3078E−01 | −1.0000E+02 | −2.5348E−01 |
| A4 = | −3.2687E−01 | −2.5238E−01 | −6.5439E−01 | −3.6082E−01 |
| A6 = | 3.5113E+00 | −2.0167E−01 | −4.5406E−01 | 2.4892E−01 |
| A8 = | −2.9725E+01 | −8.6482E−01 | 7.0484E+00 | −2.1386E−01 |
| A10 = | 8.2869E+01 | 1.2902E+00 | −4.1735E+01 | 1.3660E−01 |
| A12 = | −4.4782E+01 | −1.5103E+00 | 9.6632E+01 | −5.3880E−02 |
| A14 = | | | −8.6371E+01 | 8.7737E−03 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 2.43 | f/f2 | −0.85 |
|---|---|---|---|
| Fno | 3.00 | f1/f2 | −0.68 |
| HFOV [deg.] | 34.8 | f(1/f1 + 1/|f2|) | 2.10 |
| ln(V1/V2) | 0.88 | SAG22/CT2 | −0.08 |
| T12/CT2 | 1.00 | f/tan(HFOV) [mm] | 3.50 |
| (R1 + R2)/(R1 − R2) | 0.20 | SD/TD | 1.00 |
| R4/R3 | −0.03 | TD/ImgH | 1.28 |

Embodiment 9

Figure 9A:
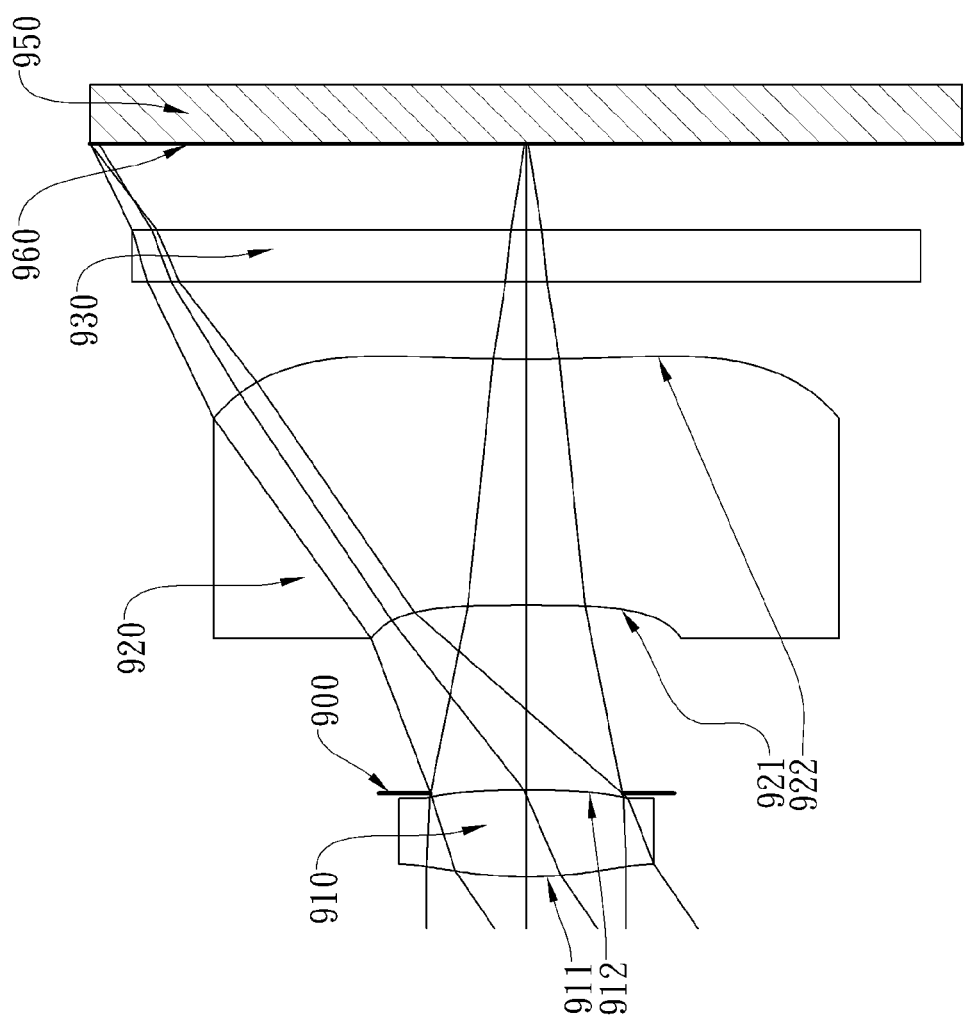
FIG. 9A shows an imaging lens system in accordance with a ninth embodiment of the present invention.
Figure 9B:
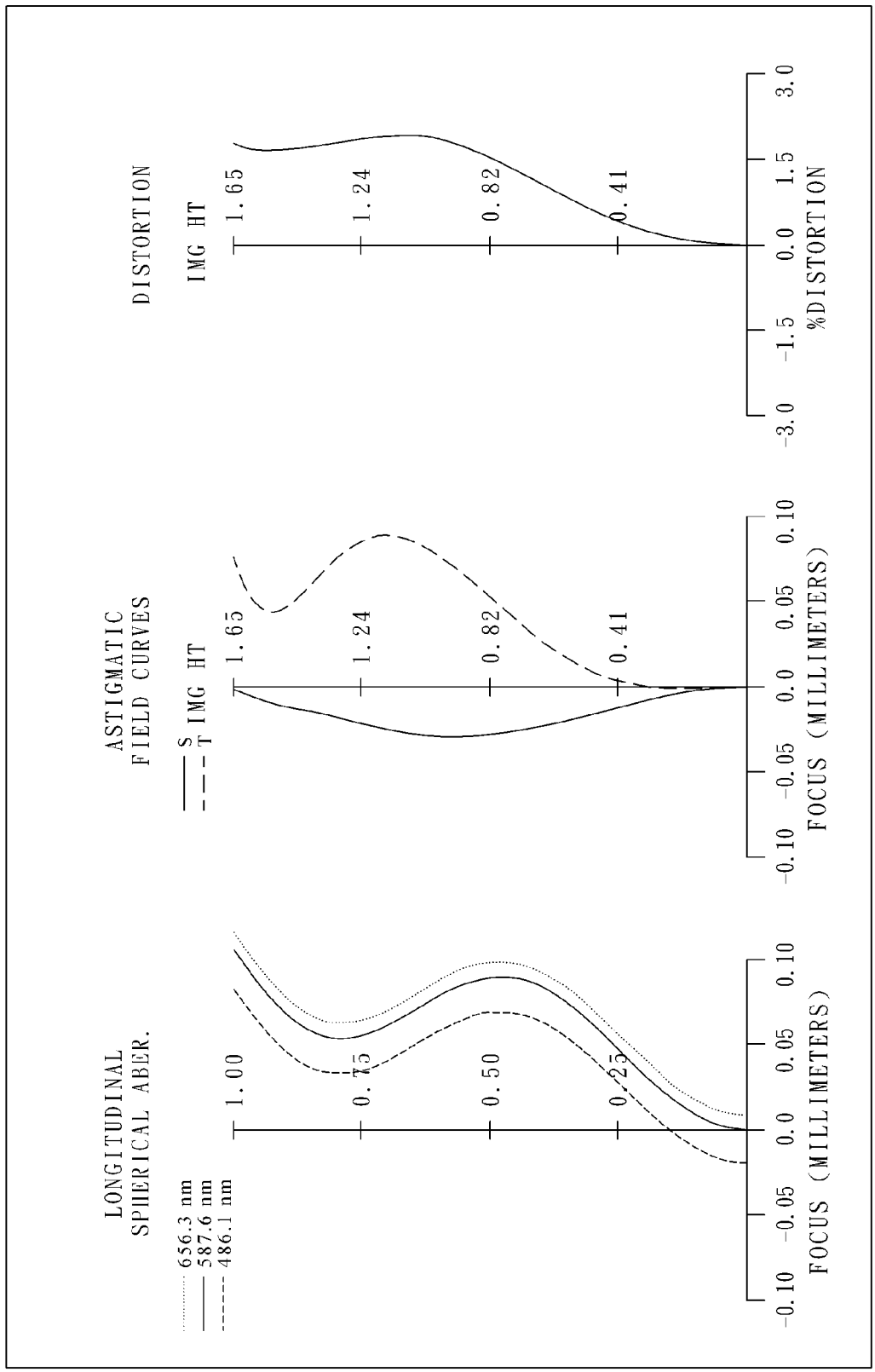
FIG. 9B shows the aberration curves of the ninth embodiment of the present invention.

FIG. 9A shows an imaging lens system in accordance with the ninth embodiment of the present invention, and FIG. 9B shows the aberration curves of the ninth embodiment of the present invention. The imaging lens system of the ninth embodiment of the present invention mainly comprises two non-cemented lens elements, in order from an object side to an image side:

a plastic first lens element 910 with positive refractive power having a convex object-side surface 911 and a convex image-side surface 912, the object-side and image-side surfaces 911 and 912 thereof being aspheric; and a plastic second lens element 920 with negative refractive power having a concave object-side surface 921 and a concave image-side surface 922, the object-side and image-side surfaces 921 and 922 thereof being aspheric; wherein the shape of the image-side surface 922 of the second lens element 920 changes from concave when near an optical axis to convex when away from the optical axis;

wherein an aperture stop 900 is disposed between the first lens element 910 and the second lens element 920;

the imaging lens system further comprises a IR cut-filter 930 disposed between the image-side surface 922 of the second lens element 920 and an image plane 960; the filter 930 is made of glass and has no influence on the focal length of the imaging lens system; the imaging lens system further comprises an image sensor 950 provided on the image plane 960.

The detailed optical data of the ninth embodiment is shown in TABLE 24, and the aspheric surface data is shown in TABLE 25 wherein the units of the radius of curvature, the thickness and the focal length are expressed in mm, and HFOV is half of the maximal field of view.

TABLE 24

(Embodiment 9)
f = 2.32 mm, Fno = 3.00, HFOV = 34.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.454 | ASP | 0.335 | Plastic | 1.544 | 55.9 | 2.05 |
| 2 | | −4.397 | ASP | −0.012 | | | | |
| 3 | Ape. Stop | Plano | | 0.726 | | | | |
| 4 | Lens 2 | −13.736 | ASP | 0.950 | Plastic | 1.640 | 23.3 | −6.81 |
| 5 | | 6.560 | ASP | 0.300 | | | | |
| 6 | IR-filter | Plano | | 0.200 | Glass | 1.517 | 64.2 | — |

TABLE 24-continued (Embodiment 9)
f = 2.32 mm, Fno = 3.00, HFOV = 34.4 deg.

| Surface # | | Curvature Radius | Thickness | Material | Index | Abbe # | Focal Length |
|---|---|---|---|---|---|---|---|
| 7 | | Plano | 0.333 | | | | |
| 8 | Image | Plano | — | | | | |

* Reference wavelength for Focal length and Index calculation is 587.6 nm

TABLE 25

| | Aspheric Coefficients | | | |
|---|---|---|---|---|
| Surface # | 1 | 2 | 4 | 5 |
| k = | −1.3008E+01 | 0.0000E+00 | −1.0000E+00 | −1.0000E+00 |
| A4 = | −2.3239E−01 | −3.4022E−01 | −3.9731E+00 | −9.2316E−02 |
| A6 = | 4.8188E+00 | −3.5265E+00 | −1.5160E+00 | −8.7572E−02 |
| A8 = | −4.8291E+01 | 1.8722E+01 | 7.0944E+00 | 1.4392E−02 |
| A10 = | 1.5114E+02 | −4.9222E+01 | −4.7236E+00 | 7.1367E−02 |
| A12 = | −1.1418E+02 | 4.6439E+01 | 1.7312E+00 | −6.3306E−02 |
| A14 = | −1.7327E+02 | 1.1603E−03 | −2.6336E+00 | 1.4355E−02 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

| (Embodiment 9) | | | |
|---|---|---|---|
| f [mm] | 2.32 | f/f2 | −0.34 |
| Fno | 3.00 | f1/f2 | −0.30 |
| HFOV [deg.] | 34.4 | f(1/f1 + 1/|f2|) | 1.47 |
| In(V1/V2) | 0.88 | SAG22/CT2 | −0.24 |
| T12/CT2 | 0.75 | f/tan(HFOV) [mm] | 3.39 |
| (R1 + R2)/(R1 − R2) | −0.50 | SD/TD | 0.84 |
| R4/R3 | −0.48 | TD/ImgH | 1.21 |

Embodiment 10

Figure 10A:
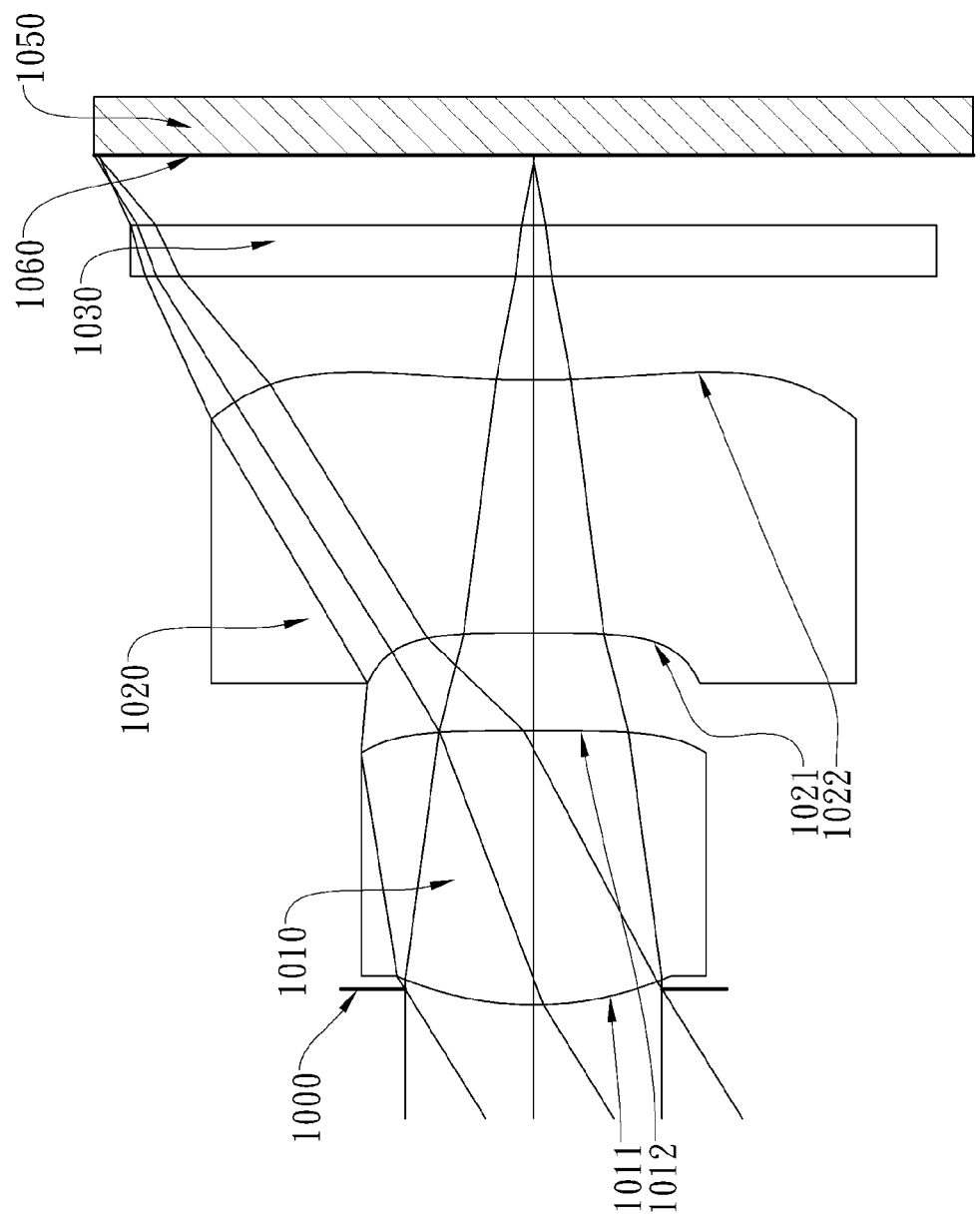
FIG. 10A shows an imaging lens system in accordance with a tenth embodiment of the present invention.
Figure 10B:
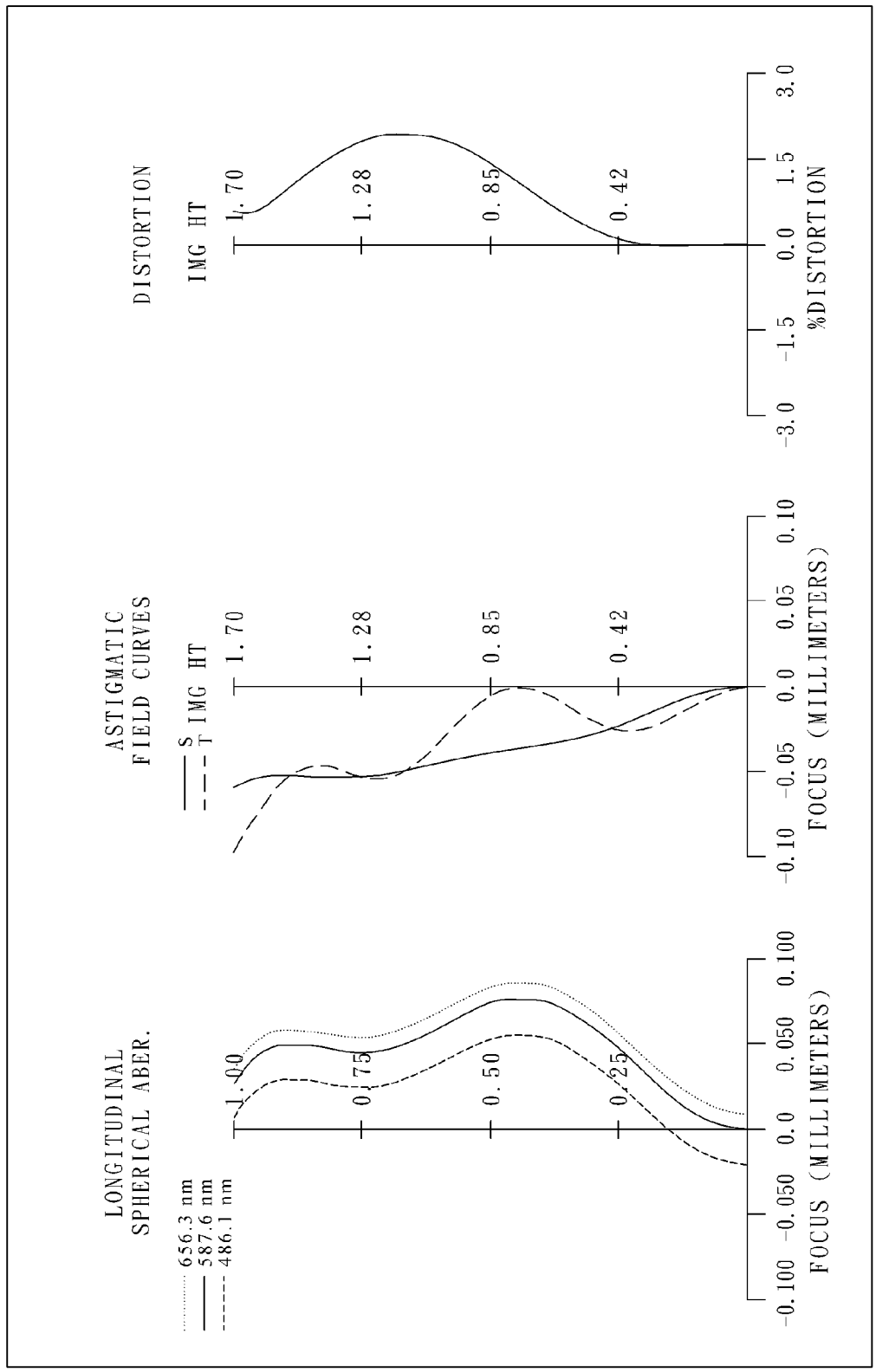
FIG. 10B shows the aberration curves of the tenth embodiment of the present invention.

FIG. 10A shows an imaging lens system in accordance with the tenth embodiment of the present invention, and FIG. 10B shows the aberration curves of the tenth embodiment of the present invention. The imaging lens system of the tenth embodiment of the present invention mainly comprises two non-cemented lens elements, in order from an object side to an image side:

a plastic first lens element 1010 with positive refractive power having a convex object-side surface 1011 and a flat image-side surface 1012, the object-side and image-side surfaces 1011 and 1012 thereof being aspheric; and a plastic second lens element 1020 with negative refractive power having a concave object-side surface 1021 and a concave image-side surface 1022, the object-side and image-side surfaces 1021 and 1022 thereof being aspheric; wherein the shape of the image-side surface 1022 of the second lens element 1020 changes from concave when near an optical axis to convex when away from the optical axis;

wherein an aperture stop 1000 is disposed between an imaged object and the first lens element 1010;

the imaging lens system further comprises a IR cut-filter 1030 disposed between the image-side surface 1022 of the second lens element 1020 and an image plane 1060; the filter 1030 is made of glass and has no influence on the focal length of the imaging lens system; the imaging lens system further comprises an image sensor 1050 provided on the image plane 1060.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
f = 2.67 mm, Fno = 2.69, HFOV = 31.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.061 | | | | |
| 2 | Lens 1 | 1.231 | ASP | 1.061 | Plastic | 1.535 | 56.3 | 2.30 |
| 3 | | ∞ | ASP | 0.378 | | | | |
| 4 | Lens 2 | −39.063 | ASP | 0.978 | Plastic | 1.640 | 23.3 | −5.03 |
| 5 | | 3.544 | ASP | 0.400 | | | | |
| 6 | IR-filter | Plano | | 0.200 | Glass | 1.517 | 64.2 | — |

TABLE 27-continued (Embodiment 10)
f = 2.67 mm, Fno = 2.69, HFOV = 31.9 deg.

| Surface # | | Curvature Radius | Thickness | Material | Index | Abbe # | Focal Length |
|---|---|---|---|---|---|---|---|
| 7 | | Plano | 0.269 | | | | |
| 8 | Image | Plano | — | | | | |

* Reference wavelength for Focal length and Index calculation is 587.6 nm

TABLE 28

| Aspheric Coefficients | | | | |
|---|---|---|---|---|
| Surface # | 2 | 3 | 4 | 5 |
| k = | −6.2393E−01 | 0.0000E+00 | −1.0000E+00 | −1.0000E+00 |
| A4 = | −2.9501E−01 | −3.5669E−01 | −4.0997E−01 | −1.7450E−01 |
| A6 = | 3.1912E+00 | 4.6615E−01 | −2.6855E+00 | 7.0184E−02 |
| A8 = | −1.6802E+01 | −2.4507E+00 | 1.5318E+01 | −1.1194E−01 |
| A10 = | 4.0863E+01 | 2.6116E+00 | −5.5963E+01 | 1.1916E−01 |
| A12 = | −3.7060E+01 | −8.7290E−01 | 1.0047E+02 | −7.1522E−02 |
| A14 = | | | −9.8837E+01 | 1.6803E−02 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

| (Embodiment 10) | | | |
|---|---|---|---|
| f [mm] | 2.67 | f/f2 | −0.53 |
| Fno | 2.69 | f1/f2 | −0.46 |
| HFOV [deg.] | 31.9 | f(1/f1 + 1/|f2|) | 1.69 |
| ln(V1/V2) | 0.88 | SAG22/CT2 | −0.15 |
| T12/CT2 | 0.39 | f/tan(HFOV) [mm] | 4.29 |
| (R1 + R2)/(R1 − R2) | −1.00 | SD/TD | 0.97 |
| R4/R3 | −0.09 | TD/ImgH | 1.42 |

It is to be noted that TABLES 1-29 show different data of the different embodiments, however, the data of the different embodiments are obtained from experiments. Therefore, any imaging lens system of the same structure is considered to be within the scope of the present invention even if it uses different data. The embodiments depicted above and the appended drawings are exemplary and are not intended to limit the scope of the present invention.

What is claimed is:

1. An imaging lens system, in order from an object side to an image side comprising two non-cemented lens elements with refractive power:
    a positive first lens element having a convex object-side surface at a paraxial region thereof and a convex or flat image-side surface at the paraxial region thereof; and
    a negative second lens element having a concave object-side surface at a paraxial region thereof and a concave image-side surface at a paraxial region thereof, and both the object-side and image-side surfaces being aspheric;
    wherein, the shape of the image-side surface of the second lens element changes from concave when near an optical axis to convex when away from the optical axis;
    wherein an Abbe number of the first lens element is V1, an Abbe number of the second lens element is V2, a curvature radius of the object-side surface of the first lens element is R1, a curvature radius of the image-side surface of the first lens element is R2, a focal length of the imaging lens system is f, half of the maximal field of view is HFOV, and they satisfy the following relations:

$0.4 < \ln(V1/V2) < 1.1;$ $-1.0 \leq (R1+R2)/(R1-R2) < 0.4;$ and $1.0 \text{ mm} < f/\tan(\text{HFOV}) < 7.5 \text{ mm}.$ 2. The imaging lens system according to claim 1, wherein the Abbe number of the first lens element is V1, the Abbe number of the second lens element is V2, and they satisfy the following relation:

$0.7 < \ln(V1/V2) < 1.1.$

3. The imaging lens system according to claim 2, wherein the Abbe number of the first lens element is V1, the Abbe number of the second lens element is V2, and they satisfy the following relation:

$0.8 < \ln(V1/V2) < 1.1.$

4. The imaging lens system according to claim 2, wherein the focal length of the imaging lens system is f, a focal length of the second lens element is f2, and they satisfy the following relation:

$-1.2 < f/f2 < -0.5.$

5. The imaging lens system according to claim 1, wherein the curvature radius of the object-side surface of the first lens element is R1, the curvature radius of the image-side surface of the first lens element is R2, and they satisfy the following relation:

$-1.0 \leq (R1+R2)/(R1-R2) < -0.3.$

6. The imaging lens system according to claim 5, wherein a focal length of the first lens element is f1, a focal length of the second lens element is f2, and they satisfy the following relation:

$-0.9 < f1/f2 < -0.4.$

7. The imaging lens system according to claim 5, wherein a curvature radius of the image-side surface of the second lens element is R4, a curvature radius of the object-side surface of the second lens element is R3, and they satisfy the following relation:

$-2.0<R4/R3<0$.

8. The imaging lens system according to claim 7, wherein an axial distance between the first lens element and the second lens element is T12, a central thickness of the second lens element is CT2, and they satisfy the following relation:

$0.3<T12/CT2<1.1$.

9. The imaging lens system according to claim 2, further comprising a stop, an axial distance from the stop to the image-side surface of the second lens element is SD, an axial distance between the object-side surface of the first lens element and the image-side surface of the second lens element is TD, and they satisfy the following relation:

$0.9<SD/TD<1.2$.

10. The imaging lens system according to claim 2, wherein at least one of the object-side and image-side surfaces of the first lens element is aspheric, an axial distance between the object-side surface of the first lens element and the image-side surface of the second lens element is TD, a maximal image height of the imaging lens system is ImgH, and they satisfy the following relation:

$0.9<TD/ImgH<1.65$.

11. An imaging lens system, in order from an object side to an image side comprising two non-cemented lens elements with refractive power:

a positive first lens element having a convex object-side surface at a paraxial region thereof and a convex or flat image-side surface at the paraxial region thereof; and a negative second lens element having a concave object-side surface at a paraxial region thereof and a concave image-side surface at a paraxial region thereof, and both the object-side and image-side surfaces being aspheric; wherein, the shape of the image-side surface of the second lens element changes from concave when near an optical axis to convex when away from the optical axis;

wherein an Abbe number of the first lens element is V1, an Abbe number of the second lens element is V2, a curvature radius of the object-side surface of the first lens element is R1, a curvature radius of the image-side surface of the first lens element is R2, the imaging lens system further comprises a stop, an axial distance from the stop to the image-side surface of the second lens element is SD, an axial distance between the object-side surface of the first lens element and the image-side surface of the second lens element is TD, and they satisfy the following relations:

$0.4<\ln(V1/V2)<1.1$;

$-1.0 \le (R1+R2)/(R1-R2)<0.4$; and $0.9<SD/TD<1.2$.

12. The imaging lens system according to claim 11, wherein the Abbe number of the first lens element is V1, the Abbe number of the second lens element is V2, and they satisfy the following relation:

$0.7<\ln(V1/V2)<1.1$.

13. The imaging lens system according to claim 12, wherein the Abbe number of the first lens element is V1, the Abbe number of the second lens element is V2, and they satisfy the following relation:

$0.8<\ln(V1/V2)<1.1$.

14. The imaging lens system according to claim 12, a focal length of the imaging lens system is f, a focal length of the first lens element is f1, a focal length of the second lens element is f2, and they satisfy the following relation:

$1.5<f(1/f1+1/|f2|)<2.25$.

15. The imaging lens system according to claim 11, wherein the curvature radius of the object-side surface of the first lens element is R1, the curvature radius of the image-side surface of the first lens element is R2, and they satisfy the following relation:

$-1.0 \le (R1+R2)/(R1-R2)<-0.3$.

16. The imaging lens system according to claim 15, wherein a curvature radius of the image-side surface of the second lens element is R4, a curvature radius of the object-side surface of the second lens element is R3, and they satisfy the following relation:

$-2.0<R4/R3<0$.

17. The imaging lens system according to claim 15, wherein a focal length of the imaging lens system is f, half of the maximal field of view is HFOV, and they satisfy the following relation:

$1.0\ \text{mm}<f/\tan(\text{HFOV})<7.5\ \text{mm}$.

18. The imaging lens system according to claim 11, wherein a distance in parallel with an optical axis from a vertex of the image-side surface of the second lens element on the optical axis to a maximal effective diameter position on the image-side surface of the second lens element is SAG22, a central thickness of the second lens element is CT2, and they satisfy the following relation:

$-0.5<SAG22/CT2<0$.

19. The imaging lens system according to claim 11, wherein an axial distance between the object-side surface of the first lens element and the image-side surface of the second lens element is TD, a maximal image height of the imaging lens system is ImgH, and they satisfy the following relation:

$0.9<TD/ImgH<1.65$.

* * * * *